US010577440B2

(12) United States Patent
Cruz et al.

(10) Patent No.: US 10,577,440 B2
(45) Date of Patent: Mar. 3, 2020

(54) RADICALLY COUPLED RESINS AND METHODS OF MAKING AND USING SAME

(71) Applicant: Chevron Phillips Chemical Company LP, The Woodlands, TX (US)

(72) Inventors: Carlos A. Cruz, Bartlesville, OK (US); Max P. McDaniel, Bartlesville, OK (US); Qing Yang, Bartlesville, OK (US); Jared L. Barr, Bartlesville, OK (US); Youlu Yu, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 377 days.

(21) Appl. No.: 14/933,847

(22) Filed: Nov. 5, 2015

(65) Prior Publication Data

US 2016/0115255 A1 Apr. 28, 2016

Related U.S. Application Data

(63) Continuation-in-part of application No. 13/799,471, filed on Mar. 13, 2013.

(51) Int. Cl.
*C08F 10/02* (2006.01)
(52) U.S. Cl.
CPC .......... *C08F 10/02* (2013.01); *C08F 2810/20* (2013.01)
(58) Field of Classification Search
None
See application file for complete search history.

(56) References Cited

U.S. PATENT DOCUMENTS 3,119,569 A 1/1964 Baricordi
3,248,179 A 4/1966 Norwood
(Continued)

FOREIGN PATENT DOCUMENTS

EP 1820820 A1 8/2007
WO 2014164498 A2 10/2014
WO 2014164498 A3 10/2014

OTHER PUBLICATIONS

Köppl, Alexander, et al., "Heterogeneous metallocene catalysts for ethlene polymerization," Journal of Molecular Catalysis A: Chemical, 2001, pp. 23-32, vol. 165, Elsevier Science B.V.
(Continued)

*Primary Examiner* — Gwendolyn Blackwell
(74) *Attorney, Agent, or Firm* — Conley Rose, P.C.

(57) ABSTRACT

A radically coupled polymer having a density of from about 0.915 g/ml to about 0.975 g/ml characterized by a crossover modulus measured in Pascals (Pa) that is equal to or less than $y_{mn}$ where $y_{mn}=180,000e^{-0.15x}$ and x is the number average molecular weight of the radically coupled polymer divided by 1,000. An ethylene polymer having a level of short chain branching ranging from about 0 to about 10 mol. %; a level of long chain branching ranging from about 0.001 $LCB/10^3$ carbons to about 1.5 $LCB/10^3$ carbons as determined by SEC-MALS; and characterized by a crossover modulus measured in Pa that is equal to or less than $y_{mn}$ where $y_{mn}=180,000^{-0.15x}$ and x is the number average molecular weight of the radically coupled polymer divided by 1,000.

20 Claims, 12 Drawing Sheets

(56) References Cited

U.S. PATENT DOCUMENTS

| | | |
|---|---|---|
| 3,887,494 A | 6/1975 | Dietz |
| 3,900,457 A | 8/1975 | Witt |
| 4,053,436 A | 10/1977 | Hogan et al. |
| 4,081,407 A | 3/1978 | Short et al. |
| 4,151,122 A | 4/1979 | McDaniel et al. |
| 4,152,503 A | 5/1979 | Short et al. |
| 4,177,162 A | 12/1979 | McDaniel et al. |
| 4,247,421 A | 1/1981 | McDaniel et al. |
| 4,248,735 A | 2/1981 | McDaniel et al. |
| 4,277,587 A | 7/1981 | McDaniel et al. |
| 4,294,724 A | 10/1981 | McDaniel |
| 4,364,842 A | 12/1982 | McDaniel et al. |
| 4,364,855 A | 12/1982 | McDaniel et al. |
| 4,382,022 A | 5/1983 | McDaniel |
| 4,444,965 A | 4/1984 | McDaniel et al. |
| 4,501,885 A | 2/1985 | Sherk et al. |
| 4,504,638 A | 3/1985 | McDaniel et al. |
| 4,526,930 A | 7/1985 | Keogh |
| 4,588,790 A | 5/1986 | Jenkins, III et al. |
| 4,735,931 A | 4/1988 | McDaniel et al. |
| 4,820,785 A | 4/1989 | McDaniel et al. |
| 4,939,217 A | 7/1990 | Stricklen |
| 4,966,951 A | 10/1990 | Benham et al. |
| 4,981,831 A | 1/1991 | Knudsen et al. |
| 5,191,132 A | 3/1993 | Patsidis et al. |
| 5,210,352 A | 5/1993 | Alt et al. |
| 5,347,026 A | 9/1994 | Patsidis et al. |
| 5,352,749 A | 10/1994 | DeChellis et al. |
| 5,399,636 A | 3/1995 | Alt et al. |
| 5,401,817 A | 3/1995 | Palackal et al. |
| 5,420,320 A | 5/1995 | Zenk et al. |
| 5,436,304 A | 7/1995 | Griffin et al. |
| 5,436,305 A | 7/1995 | Alt et al. |
| 5,451,649 A | 9/1995 | Zenk et al. |
| 5,455,314 A | 10/1995 | Burns et al. |
| 5,496,781 A | 3/1996 | Geerts et al. |
| 5,498,581 A | 3/1996 | Welch et al. |
| 5,530,072 A | 6/1996 | Shirodkar |
| 5,541,272 A | 7/1996 | Schmid et al. |
| 5,554,795 A | 9/1996 | Frey et al. |
| 5,563,284 A | 10/1996 | Frey et al. |
| 5,565,175 A | 10/1996 | Hottovy et al. |
| 5,565,592 A | 10/1996 | Patsidis et al. |
| 5,571,880 A | 11/1996 | Alt et al. |
| 5,575,979 A | 11/1996 | Hanson |
| 5,594,078 A | 1/1997 | Welch et al. |
| 5,599,887 A * | 2/1997 | Badley .............. C08F 10/02 502/256 |
| 5,631,203 A | 5/1997 | Welch et al. |
| 5,631,335 A | 5/1997 | Alt et al. |
| 5,654,454 A | 8/1997 | Peifer et al. |
| 5,668,230 A | 9/1997 | Schertl et al. |
| 5,705,478 A | 1/1998 | Boime |
| 5,705,579 A | 1/1998 | Hawley et al. |
| 6,174,971 B1 | 1/2001 | Chen et al. |
| 6,187,880 B1 | 2/2001 | Welch et al. |
| 6,239,235 B1 | 5/2001 | Hottovy et al. |
| 6,262,191 B1 | 7/2001 | Hottovy et al. |
| 6,388,016 B1 | 5/2002 | Abdou-Sabet et al. |
| 6,486,274 B1 | 11/2002 | Gray et al. |
| 6,509,427 B1 | 1/2003 | Welch et al. |
| 6,521,306 B1 | 2/2003 | Hoenig et al. |
| 6,833,415 B2 | 12/2004 | Kendrick et al. |
| 6,904,940 B2 | 6/2005 | Scheelen et al. |
| 7,026,494 B1 | 4/2006 | Yang et al. |
| 7,041,744 B2 | 5/2006 | Palmlöf et al. |
| 7,067,603 B1 * | 6/2006 | Karandinos .......... C08F 10/00 524/81 |
| 7,093,620 B2 | 8/2006 | Dehennau et al. |
| 7,160,926 B2 * | 1/2007 | Hasegawa ............ C08J 5/225 521/27 |
| 7,709,577 B2 | 5/2010 | Jiang et al. |
| 7,714,072 B2 | 5/2010 | Michie, Jr. et al. |
| 7,744,803 B2 | 6/2010 | Jackson et al. |
| 7,776,987 B2 * | 8/2010 | Oswald ................ C08J 5/18 264/176.1 |
| 7,795,321 B2 | 9/2010 | Cheung et al. |
| 7,863,348 B2 | 1/2011 | Abt et al. |
| 7,897,710 B2 | 3/2011 | Amos et al. |
| 7,923,121 B2 | 4/2011 | Jackson et al. |
| 7,928,164 B2 | 4/2011 | Jiang et al. |
| 7,935,760 B2 | 5/2011 | Jiang et al. |
| 7,951,872 B2 | 5/2011 | Jacob et al. |
| 8,039,556 B2 | 10/2011 | Krishnaswamy et al. |
| 8,049,052 B2 | 11/2011 | Kreischer et al. |
| 8,192,813 B2 | 6/2012 | Runyan et al. |
| 8,318,883 B1 | 11/2012 | Yang et al. |
| 8,372,771 B2 | 2/2013 | Benham et al. |
| 8,410,217 B2 | 4/2013 | Tse et al. |
| 8,815,357 B1 | 8/2014 | Inn et al. |
| 8,865,846 B2 | 10/2014 | Ding et al. |
| 8,912,285 B2 | 12/2014 | Yang et al. |
| 9,006,367 B2 | 4/2015 | McDaniel et al. |
| 2004/0214953 A1 | 10/2004 | Yamada et al. |
| 2005/0153830 A1 | 7/2005 | Jensen et al. |
| 2007/0117933 A1 | 5/2007 | Giacobbi et al. |
| 2007/0129238 A1 * | 6/2007 | Blackmon ............ B01J 31/0212 502/158 |
| 2008/0226858 A1 | 9/2008 | Walter et al. |
| 2009/0026282 A1 | 1/2009 | Bonnet et al. |
| 2009/0246433 A1 | 10/2009 | Michie et al. |
| 2010/0160579 A1 | 6/2010 | Yang et al. |
| 2010/0221561 A1 | 9/2010 | Sherman, Jr. et al. |
| 2011/0008559 A1 | 1/2011 | Ruemer |
| 2011/0039082 A1 * | 2/2011 | Yun .............. C08J 5/18 428/213 |
| 2011/0040381 A1 | 2/2011 | Kidd et al. |
| 2011/0111153 A1 | 5/2011 | Russell et al. |
| 2014/0045997 A1 * | 2/2014 | Guan .............. C08J 3/24 525/196 |
| 2014/0275462 A1 * | 9/2014 | Yang .............. C08F 10/02 526/352 |

OTHER PUBLICATIONS

Kajigaeshi, Shoji, et al., "Selective Preparation of Fluorene Derivatives Using the t-Butyl Function as a Positional Protective Group," Bull. Chem. Soc. Jpn., Jan. 1986, pp. 97-103, vol. 59, No. 1, The Chemical Society of Japan.

Alt, Helmut G., et al., "C1-verbrückte Fluorenyliden—Indenylidenkomplexe des Typs (C13H8-CR2- C9H6_nR'n) ZrCl2 (n = 0, 1; R = Me, Ph, Butenyl; R' = Alkyl, Alkenyl) als Metallocenkatalysatorvorstufen für die Ethylenpolymerisation," Journal of Organometallic Chemistry, 1998, pp. 153-181, vol. 562, Elsevier Science S.A.

Alt, Helmut G., et al., "C1-Bridged fluorenylidene cyclopentadienylidene complexes of the type (C13H8-CR1R2-C5H3R)ZrCl2 (R1, R2 = alkyl, phenyl, alkenyl; R = H, alkyl, alkenyl, substituted silyl) as catalyst precursors for the polymerization of ethylene and propylene," Journal of Organometallic Chemistry, 1998, pp. 87-112, vol. 568, Elsevier Science S.A.

Wailes, P. C., et al., "Organometallic Chemistry of Titanium, Zirconium, and Hafnium," 1974, pp. 89, 91, 92, 150, 151, 155 plus 6 pages of cover, publishing information, and contents, Academic Press, New York.

Cardin, D. J., et al., "Chemistry of Organo-Zirconium and -Hafnium Compounds," 1986, pp. 145-160 plus 5 pages of cover, publishing information, and contents, Halstead Press: a division of John Wiley & Sons, New York.

Hieber, C. A., et al., "Shear-Rate-Dependence Modeling of Polymer Melt Viscosity," Jul. 1992, pp. 931-938, vol. 32, No. 14, Polymer Engineering and Science.

Hieber, C. A., et al., "Some correlations involving the shear viscosity of polystyrene melts," 1989, pp. 321-332, vol. 28, No. 4, Rheologica Acta.

Bird, R. Byron, et al., "Dynamics of Polymeric Liquids," Fluid Mechanics, vol. 1, Second Edition, 1987, cover page, publishing page, pp. xiii-xviii, and 171-172, John Wiley & Sons, Inc.

(56) References Cited

OTHER PUBLICATIONS

Yu, Youlu, et. al., "SEC-MALS method for the determination of long-chain branching and long-chain branching distribution in polyethylene", Polymer, 2005, vol. 46, pp. 5165-5182, Elsevier Ltd.

Janzen, J., et al., "Diagnosing long-chain branching in polyethylenes," Journal of Molecular Structure, 1999, pp. 569-584 plus 2 pages of comments and information, vol. 485-486, Elsevier Science B.V.

"Group notation revised in periodic table," Feb. 4, 1985, C&EN, pp. 26-27.

McNaught, Alan D., et al., "Compendium of Chemical Terminology," International Union of Pure and Applied Chemistry, Second edition, 1997, 5 pages, Wiley-Blackwell.

Daly, John M., et al., "Melt Rheology and its Role in Plastics Processing," 1990, 4 pages, Van Nostrand Reinhold.

Foreign communication from a related counterpart application—Partial International Search, Annex to Form PCT/ISA/206, PCT/US2014/022605, dated May 28, 2014, 2 pages.

Foreign communication from a related counterpart application—International Search Report and Written Opinion, PCT/US2014/022605, dated Sep. 30, 2014, 14 pages.

Foreign communication from a related counterpart application—International Preliminary Report on Patentability, PCT/US2014/022605, dated Sep. 15, 2015, 9 pages.

Office Action dated Feb. 4, 2015 (35 pages), U.S. Appl. No. 13/799,471, filed Mar. 13, 2013.

Office Action (Final) dated Sep. 18, 2015 (8 pages), U.S. Appl. No. 13/799,471, filed Mar. 13, 2013.

Foreign communication from a related counterpart application—European Examination Report, Application No. 14716675.5 dated May 23, 2018 (5 pages).

Office Action dated Mar. 27, 2018 (13 pages), U.S. Appl. No. 13/799,471, filed Mar. 13, 2013.

\* cited by examiner

1 …

RADICALLY COUPLED RESINS AND METHODS OF MAKING AND USING SAME

CROSS-REFERENCE TO RELATED APPLICATIONS

This application is a continuation-in-part of and claims priority to U.S. patent application Ser. No. 13/799,471 filed on Mar. 13, 2013, and entitled "Radically Coupled Resins and Methods of Making and Using Same," which is incorporated by reference herein in its entirety.

TECHNICAL FIELD

The present disclosure relates to novel polymers and methods of making and using same. More specifically, the present disclosure relates to polymers having improved processability.

BACKGROUND

Polymers, such as polyethylene homopolymers and copolymers, are used for the production of a wide variety of articles. The use of a particular polymer in a particular application will depend on the type of physical and/or mechanical properties displayed by the polymer. Thus, there is an ongoing need to develop polymers that display novel physical and/or mechanical properties and methods for producing these polymers.

BRIEF SUMMARY

Disclosed herein is a radically-coupled polymer having a density of from about 0.915 g/ml to about 0.975 g/ml characterized by a crossover modulus that is equal to or less than $y_{mn}$ where $y_{mn}=180,000e^{-0.15x}$ and x is the number average molecular weight of the radically coupled polymer divided by 1,000, and the crossover modulus is measured in units of Pascals (Pa).

Also disclosed herein is an ethylene polymer having a level of short chain branching ranging from about 0 to about 10 mol. %; a level of long chain branching ranging from about 0.001 LCB/$10^3$ carbons to about 1.5 LCB/$10^3$ carbons as determined by SEC-MALS; and characterized by a crossover modulus that is equal to or less than $y_{mn}$ where $y_{mn}=180,000e^{-0.15x}$ and x is the number average molecular weight of the radically coupled polymer divided by 1,000, and the crossover modulus is measured in units of (Pa).

Also disclosed herein is an ethylene polymer characterized by a higher molecular weight (HMW) component and a lower molecular weight (LMW) component having a polydispersity index ranging from about 8 to about 25; a level of long chain branching ranging from about 0.001 LCB/$10^3$ carbons to about 1.5 LCB/$10^3$ carbons as determined by SEC-MALS and characterized by a crossover modulus that is equal to or less than $y_{mn}$ where $y_{mn}=180,000e^{-0.15x}$ and x is the number average molecular weight of the radically coupled polymer divided by 1,000, and the crossover modulus is measured in units of Pa.

DETAILED DESCRIPTION

Figure 1:
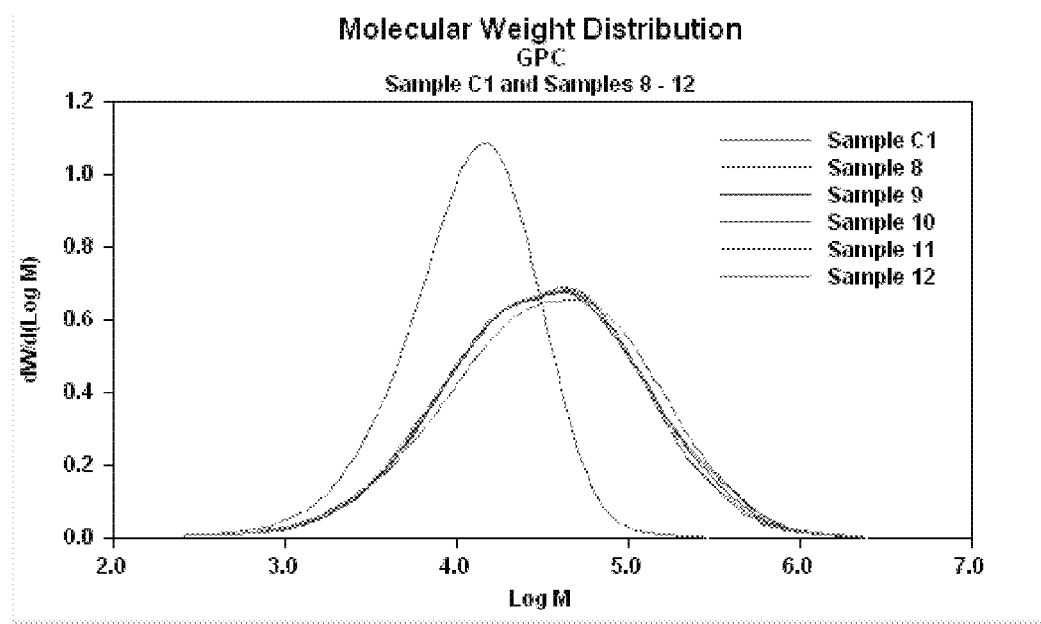
FIG. 1 is a plot of the molecular weight distribution profile for samples from Example 3.

Disclosed herein are polymers, polymer compositions, and methods of making and using same. In an embodiment, a method of the present disclosure comprises reactive extrusion of a parent polymer (PARPOL) to produce a radically coupled resin (RCR). In an embodiment, the RCR exhibits a polymer architecture characterized by an elevated frequency of topological variations resulting in a polymer having improved rheological characteristics and processability over a broad range of densities. In an embodiment, the topological variations comprise long chain branching.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2$^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Groups of elements of the table are indicated using the numbering scheme indicated in the version of the periodic table of elements published in *Chemical and Engineering News*, 63(5), 27, 1985. In some instances a group of elements may be indicated using a common name assigned to the group; for example alkali earth metals (or alkali metals) for Group 1 elements, alkaline earth metals (or alkaline metals) for Group 2 elements, transition metals for Group 3-12 elements, and halogens for Group 17 elements.

A chemical "group" is described according to how that group is formally derived from a reference or "parent" compound, for example, by the number of hydrogen atoms formally removed from the parent compound to generate the group, even if that group is not literally synthesized in this manner. These groups can be utilized as substituents or coordinated or bonded to metal atoms. By way of example, an "alkyl group" formally can be derived by removing one hydrogen atom from an alkane, while an "alkylene group" formally can be derived by removing two hydrogen atoms from an alkane. Moreover, a more general term can be used to encompass a variety of groups that formally are derived by removing any number ("one or more") hydrogen atoms from a parent compound, which in this example can be described as an "alkane group," and which encompasses an "alkyl group," an "alkylene group," and materials have three or more hydrogen atoms, as necessary for the situation, removed from the alkane. Throughout, the disclosure that a substituent, ligand, or other chemical moiety may constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedure, unless specified otherwise or the context requires otherwise.

The term "substituted" when used to describe a group, for example, when referring to a substituted analog of a particular group, is intended to describe any non-hydrogen moiety that formally replaces a hydrogen atom in that group, and is intended to be non-limiting. A group or groups may also be referred to herein as "unsubstituted" or by equivalent terms such as "non-substituted," which refers to the original group in which a non-hydrogen moiety does not replace a hydrogen atom within that group. "Substituted" is intended to be non-limiting and include inorganic substituents or organic substituents.

Unless otherwise specified, any carbon-containing group for which the number of carbon atoms is not specified can have, according to proper chemical practice, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 carbon atoms, or any range or combination of ranges between these values. For example, unless otherwise specified, any carbon-containing group can have from 1 to 30 carbon atoms, from 1 to 25 carbon atoms, from 1 to 20 carbon atoms, from 1 to 15 carbon atoms, from 1 to 10 carbon atoms, or from 1 to 5 carbon atoms, and the like. Moreover, other identifiers or qualifying terms may be utilized to indicate the presence or absence of a particular substituent, a particular regiochemistry and/or stereochemistry, or the presence or absence of a branched underlying structure or backbone.

Within this disclosure the normal rules of organic nomenclature will prevail. For instance, when referencing substituted compounds or groups, references to substitution patterns are taken to indicate that the indicated group(s) is (are) located at the indicated position and that all other non-indicated positions are hydrogen. For example, reference to a 4-substituted phenyl group indicates that there is a non-hydrogen substituent located at the 4 position and hydrogen atoms located at the 2, 3, 5, and 6 positions. By way of another example, reference to a 3-substituted naphth-2-yl indicates that there is a non-hydrogen substituent located at the 3 position and hydrogen atoms located at the 1, 4, 5, 6, 7, and 8 positions. References to compounds or groups having substitutions at positions in addition to the indicated position will be reference using comprising or some other alternative language. For example, a reference to a phenyl group comprising a substituent at the 4 position refers to a group having a non-hydrogen atom at the 4 position and hydrogen or any non-hydrogen group at the 2, 3, 5, and 6 positions.

Embodiments disclosed herein the may provide the materials listed as suitable for satisfying a particular feature of the embodiment delimited by the term "or." For example, a particular feature of the disclosed subject matter may be disclosed as follows: Feature X can be A, B, or C. It is also contemplated that for each feature the statement can also be phrased as a listing of alternatives such that the statement "Feature X is A, alternatively B, or alternatively C" is also an embodiment of the present disclosure whether or not the statement is explicitly recited.

In an embodiment, the polymers disclosed herein are olefin or alpha-olefin polymers. Herein, the polymer refers both to a material collected as the product of a polymerization reaction (e.g., a reactor or virgin resin) and a polymeric composition comprising a polymer and one or more additives. In an embodiment, a monomer (e.g., ethylene) may be polymerized using the methodologies disclosed herein to produce a polymer of the type disclosed herein. The polymer may comprise a homopolymer. It is to be understood that an inconsequential amount of comonomer may be present in the polymers disclosed herein and the polymer still be considered a homopolymer. Herein an inconsequential amount of a comonomer refers to an amount that does not substantively affect the properties of the polymer disclosed herein. For example a comonomer can be present in an amount of less than about 1.0 wt. %, 0.5 wt. %, 0.1 wt. %, or 0.01 wt. % based on the total weight of polymer.

In an alternative embodiment, the polymer is a copolymer. Examples of suitable comonomers include without limitation unsaturated hydrocarbons having from 3 to 20 carbon atoms such as propylene, 1-butene, 1-pentene, 1-hexene, 3-methyl-1-butene, 4-methyl-1-pentene, 1-heptene, 1-octene, 1-nonene, 1-decene, and mixtures thereof. In an embodiment, the PARPOL is a polymer of ethylene, e.g., polyethylene (PE). The applicability of the aspects and features disclosed herein to linear olefin polymers (e.g., ethylene, propylene and 1-butylene) and olefin copolymers are also contemplated. PARPOLs may be used for forming the novel polymers (e.g., radically coupled resins) of this disclosure.

In an embodiment, a PARPOL of the type described herein may be prepared by any suitable methodology, for example by employing one or more catalyst systems, in one or more reactors, in solution, in slurry, or in the gas phase, and/or by varying the monomer concentration in the polymerization reaction, and/or by changing any/all of the materials or parameters involved in the production of the PARPOLs, as will be described in more detail later herein.

The PARPOL of the present disclosure can be produced using various types of polymerization reactors. As used herein, "polymerization reactor" includes any reactor capable of polymerizing olefin monomers to produce homopolymers and/or copolymers. Homopolymers and/or copolymers produced in the reactor may be referred to as resin and/or polymers. The various types of reactors include, but are not limited to those that may be referred to as batch, slurry, gas-phase, solution, high pressure, tubular, autoclave, or other reactor and/or reactors. Gas phase reactors may comprise fluidized bed reactors or staged horizontal reactors. Slurry reactors may comprise vertical and/or horizontal loops. High pressure reactors may comprise autoclave and/or tubular reactors. Reactor types may include batch and/or continuous processes. Continuous processes may use intermittent and/or continuous product discharge or transfer. Processes may also include partial or full direct recycle of un-reacted monomer, un-reacted comonomer, catalyst and/or co-catalysts, diluents, and/or other materials of the polymerization process.

Polymerization reactor systems of the present disclosure may comprise one type of reactor in a system or multiple reactors of the same or different type, operated in any suitable configuration. Production of polymers in multiple reactors may include several stages in at least two separate polymerization reactors interconnected by a transfer system making it possible to transfer the polymers resulting from the first polymerization reactor into the second reactor. Alternatively, polymerization in multiple reactors may include the transfer, either manual or automatic, of polymer from one reactor to subsequent reactor or reactors for additional polymerization. Alternatively, multi-stage or multi-step polymerization may take place in a single reactor, wherein the conditions are changed such that a different polymerization reaction takes place.

The desired polymerization conditions in one of the reactors may be the same as or different from the operating conditions of any other reactors involved in the overall process of producing the polymer of the present disclosure. Multiple reactor systems may include any combination including, but not limited to multiple loop reactors, multiple gas phase reactors, a combination of loop and gas phase reactors, multiple high pressure reactors or a combination of high pressure with loop and/or gas reactors. The multiple reactors may be operated in series or in parallel. In an embodiment, any arrangement and/or any combination of reactors may be employed to produce the polymer of the present disclosure.

According to one embodiment, the polymerization reactor system may comprise at least one loop slurry reactor. Such reactors may comprise vertical or horizontal loops. Monomer, diluent, catalyst system, and optionally any comonomer may be continuously fed to a loop slurry reactor, where polymerization occurs. Generally, continuous processes may comprise the continuous introduction of a monomer, a catalyst, and/or a diluent into a polymerization reactor and the continuous removal from this reactor of a suspension comprising polymer particles and the diluent. Reactor effluent may be flashed to remove the liquids that comprise the diluent from the solid polymer, monomer and/or comonomer. Various technologies may be used for this separation step including but not limited to, flashing that may include any combination of heat addition and pressure reduction; separation by cyclonic action in either a cyclone or hydrocyclone; separation by centrifugation; or other appropriate method of separation.

Suitable slurry polymerization processes (also known as particle-form processes) are disclosed in U.S. Pat. Nos. 3,248,179, 4,501,885, 5,565,175, 5,575,979, 6,239,235, 6,262,191 and 6,833,415, for example; each of which are herein incorporated by reference in their entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor may comprise at least one gas phase reactor. Such systems may employ a continuous recycle stream containing one or more monomers continuously cycled through a fluidized bed in the presence of the catalyst under polymerization conditions. A recycle stream may be withdrawn from the fluidized bed and recycled back into the reactor. Simultaneously, polymer product may be withdrawn from the reactor and new or fresh monomer may be added to replace the polymerized monomer. Such gas phase reactors may comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 4,588,790, 5,352,749, and 5,436,304, each of which is incorporated by reference in its entirety herein.

According to still another embodiment, a high pressure polymerization reactor may comprise a tubular reactor or an autoclave reactor. Tubular reactors may have several zones where fresh monomer, initiators, or catalysts are added. Monomer may be entrained in an inert gaseous stream and introduced at one zone of the reactor. Initiators, catalysts, and/or catalyst components may be entrained in a gaseous stream and introduced at another zone of the reactor. The gas streams may be intermixed for polymerization. Heat and pressure may be employed appropriately to obtain optimal polymerization reaction conditions.

According to yet another embodiment, the polymerization reactor may comprise a solution polymerization reactor wherein the monomer is contacted with the catalyst composition by suitable stirring or other means. A carrier comprising an organic diluent or excess monomer may be employed. If desired, the monomer may be brought in the vapor phase into contact with the catalytic reaction product, in the presence or absence of liquid material. The polymerization zone is maintained at temperatures and pressures that will result in the formation of a solution of the polymer in a reaction medium. Agitation may be employed to obtain better temperature control and to maintain uniform polymerization mixtures throughout the polymerization zone. Adequate means are utilized for dissipating the exothermic heat of polymerization.

Polymerization reactors suitable for the present disclosure may further comprise any combination of at least one raw material feed system, at least one feed system for catalyst or catalyst components, and/or at least one polymer recovery system. Suitable reactor systems for the present invention may further comprise systems for feedstock purification, catalyst storage and preparation, extrusion, reactor cooling, polymer recovery, fractionation, recycle, storage, loadout, laboratory analysis, and process control.

Conditions that are controlled for polymerization efficiency and to provide polymer properties include, but are not limited to temperature, pressure, type and quantity of catalyst or co-catalyst, and the concentrations of various reactants. Polymerization temperature can affect catalyst productivity, polymer molecular weight and molecular weight distribution. Suitable polymerization temperatures may be any temperature below the de-polymerization temperature, according to the Gibbs Free Energy Equation. Typically, this includes from about 60° C. to about 280° C., for example, and/or from about 70° C. to about 110° C., depending upon the type of polymerization reactor and/or polymerization process.

Suitable pressures will also vary according to the reactor and polymerization process. The pressure for liquid phase polymerization in a loop reactor is typically less than 1000 psig. Pressure for gas phase polymerization is usually at about 200-500 psig. High pressure polymerization in tubular or autoclave reactors is generally run at about 20,000 to 75,000 psig. Polymerization reactors can also be operated in a supercritical region occurring at generally higher temperatures and pressures. Operation above the critical point of a pressure/temperature diagram (supercritical phase) may offer advantages.

The concentration of various reactants can be controlled to produce polymers with certain physical and mechanical properties. The proposed end-use product that will be formed by the polymer and the method of forming that product may be varied to determine the desired final product properties. Mechanical properties include, but are not limited to tensile strength, flexural modulus, impact resistance, creep, stress relaxation and hardness tests. Physical properties include, but are not limited to density, molecular weight, molecular weight distribution, melting temperature, glass transition temperature, temperature melt of crystallization, density, stereoregularity, crack growth, short chain branching, long chain branching and rheological measurements.

The concentrations of monomer, co-monomer, hydrogen, co-catalyst, modifiers, and electron donors are generally important in producing specific polymer properties. Comonomer may be used to control product density. Hydrogen may be used to control product molecular weight. Co-catalysts may be used to alkylate, scavenge poisons and/or control molecular weight. The concentration of poisons may be minimized, as poisons may impact the reactions and/or otherwise affect polymer product properties. Modifiers may be used to control product properties and electron donors may affect stereoregularity.

In an embodiment, a method of preparing a PARPOL comprises contacting an olefin (e.g., ethylene) monomer with a catalyst system under conditions suitable for the formation of a polymer of the type described herein. In an embodiment, the catalyst system comprises a transition-metal complex. The terms "catalyst composition," "catalyst mixture," "catalyst system," and the like, do not depend upon the actual product resulting from the contact or reaction of the components of the mixtures, the nature of the active catalytic site, or the fate of the co-catalyst, the catalyst, any olefin monomer used to prepare a precontacted mixture, or the activator-support, after combining these components. Therefore, the terms "catalyst composition," "catalyst mixture," "catalyst system," and the like, can include both heterogeneous compositions and homogenous compositions.

In an embodiment, a catalyst system suitable for the preparation of a PARPOL comprises a metallocene-containing catalyst. Nonlimiting examples of metallocene-containing catalysts suitable for use in this disclosure are described in more detail in U.S. Pat. Nos. 4,939,217; 5,191,132; 5,210,352; 5,347,026; 5,399,636; 5,401,817; 5,420,320; 5,436,305; 5,451,649; 5,496,781; 5,498,581; 5,541,272; 5,554,795; 5,563,284; 5,565,592; 5,571,880; 5,594,078; 5,631,203; 5,631,335; 5,654,454; 5,668,230; 5,705,478; 5,705,579; 6,187,880; 6,509,427; 7,026,494, and U.S. Patent App. No. 20100190926 A1, each of which is incorporated by reference herein in its entirety. Other processes to prepare metallocene compounds suitable for use in this disclosure have been reported in references such as: Koppl, A. Alt, H. G. J. Mol. Catal. A. 2001, 165, 23; Kajigaeshi, S.; Kadowaki, T.; Nishida, A.; Fujisaki, S. The Chemical Society of Japan, 1986, 59, 97; Alt, H. G.; Jung, M.; Kehr, G. J. Organomet. Chem. 1998, 562, 153-181; and Alt, H. G.; Jung, M. J. Organomet. Chem. 1998, 568, 87-112; each of which is incorporated by reference herein in its entirety. The following treatises also describe such methods: Wailes, P. C.; Coutts, R. S. P.; Weigold, H. in Organometallic Chemistry of Titanium, Zirconium, and Hafnium, Academic; New York, 1974.; Cardin, D. J.; Lappert, M. F.; and Raston, C. L.; Chemistry of Organo-Zirconium and -Hafnium Compounds; Halstead Press; New York, 1986.

In an embodiment, a catalyst system suitable for the preparation of a PARPOL comprises a Ziegler-Natta catalyst. Nonlimiting examples of Ziegler-Natta catalysts suitable for use in this disclosure are described in more detail in U.S. Pat. Nos. 6,174,971 and 6,486,274, each of which is incorporated by reference herein in its entirety.

In an embodiment, a catalyst system suitable for the preparation of a PARPOL comprises a chromium-based catalyst. Nonlimiting examples of chromium-based catalysts suitable for use in this disclosure are described in more detail in U.S. Patent App. Nos. 20100113851 A1 and 20110201768 A1, each of which is incorporated by reference herein in its entirety. Chromium catalysts are used throughout the world for the polymerization of polyethylene. Catalyst manufacturers prepare the catalysts, often by placing the chromium on a solid support, such as alumina, silica, aluminophosphate, silica-alumina, silica-titania, silica-zirconia, clay, etc. The support helps to stabilize the activity of the chromium and allows the catalyst to be shipped in an inactive form to the purchaser. Once the catalyst arrives at a polymer manufacturing site, it must be activated for use in the polymerization process. Typically, chromium catalysts are activated by calcining or heating large quantities of the catalyst in dry air, in some type of activation apparatus of vessel such as a fluidized bed activator. The following references are incorporated as examples of chromium catalysts that are suitable for use in the present disclosure: U.S. Pat. Nos. 3,887,494, 3,119,569, 4,081,407, 4,152,503, 4,053,436, 4,981,831, 4,364,842, 4,444,965, 4,364,855, 4,504,638, 3,900,457, 4,294,724, 4,382,022, 4,151,122, 4,247,421, 4,248,735, 4,277,587, 4,177,162, 4,735,931, 4,820,785, and 4,966,951.

The PARPOL may comprise additives. Examples of additives include, but are not limited to, antistatic agents, colorants, stabilizers, nucleators, surface modifiers, pigments, slip agents, antiblocks, tackifiers, polymer processing aids, and combinations thereof. In an embodiment, the polymeric composition comprises carbon black. Such additives may be used singularly or in combination and may be included in the polymer composition before, during, or after preparation of the PARPOL composition as described herein. Such additives may be added via any suitable technique, for example during an extrusion or compounding step such as during pelletization or subsequent processing into an end use article. Such additives may be added to the polymer before, during, and/or after the reactive extrusion process described herein (e.g., additives may be added to the PARPOL before reactive extrusion, additives may be added to the PARPOL during reactive extrusion, additives may be added to the resultant radically coupled resin (i.e., RCR) form from reactive extrusion, or combinations thereof).

A PARPOL (and likewise a resultant RCR) may be further described by reference to one or more parameters such as density, molecular weight, molecular weight distribution, modality, melt index, high load melt index, Carreau-Yasuda "a" parameter, zero shear viscosity, relaxation time, degree of branching (e.g., short and/or long chain branching), and degree of unsaturation. While each of these parameters is described generally, it is understood that each such parameter and combinations thereof is applicable to any particular PARPOL of the type disclosed herein such as, by way of non-limiting examples, polyolefin homopolymers {e.g., polyethylene homopolymers, polyalphaolefins (PAO)}, copolymers (e.g., copolymers of ethylene and propene, 1-butene, 1-pentene, 1-hexene, 1-heptene, 1-octene, etc.).

In an embodiment, a PARPOL of the type described herein is characterized by a density of from about 0.915 g/ml to about 0.975 g/ml, alternatively from about 0.925 g/ml to about 0.975 g/ml, or alternatively from about 0.950 g/ml to about 0.975 g/ml, as determined in accordance with ASTM D1505.

In an embodiment, a PARPOL of the type described herein may be characterized by a weight average molecular weight ($M_w$) of less than about 100,000 g/mol., alternatively from about 350 g/mol to about 50,000 g/mol, alternatively from about 1,000 g/mol to about 40,000 g/mol; alternatively from about 10,000 g/mol to about 40,000 g/mol; or alternatively from about 25,000 g/mol to about 40,000 g/mol; a number average molecular weight ($M_n$) of from about 100 g/mol to about 40,000 g/mol, alternatively from about 5000 g/mol to about 40,000 g/mol; alternatively from about 100 g/mol to about 20,000 g/mol; alternatively from about 100 g/mol to about 16,000 g/mol; or alternatively from about 500 g/mol to about 16,000 g/mol; alternatively from about 1,250 g/mol to about 16,000 g/mol; and a z-average molecular weight ($M_z$) of from about 1,400 g/mol to about 1,5000,000 g/mol, alternatively from about 400,000 g/mol to about 1,500,000 g/mol, alternatively from about 1,400 g/mol to about 750,000 g/mol; alternatively from about 4,000 g/mol to about 600,000 g/mol; alternatively from about 40,000 g/mol to about 600,000 g/mol; or alternatively from about 100,000 g/mol to about 600,000 g/mol. The $M_w$ describes the size average of a polymer composition and can be calculated according to equation 1:

$$M_w = \frac{\sum_i N_i M_i^2}{\sum_i N_i M_i} \quad (1)$$

wherein $N_i$ is the number of molecules of molecular weight $M_i$. All molecular weight averages are expressed in gram per mole (g/mol). The $M_n$ is the common average of the molecular weights of the individual polymers calculated by measuring the molecular weight $M_i$ of $N_i$ polymer molecules, summing the weights, and dividing by the total number of polymer molecules, according to equation 2:

$$M_n = \frac{\sum_i N_i M_i}{\sum_i N_i} \quad (2)$$

The $M_z$ is a higher order molecular weight average which is calculated according to equation 3:

$$M_z = \frac{\sum_i N_i M_i^3}{\sum_i N_i M_i^2} \quad (3)$$

wherein $N_i$ is the number of molecules of molecular weight $M_i$.

The molecular weight distribution (MWD) of the PARPOL may be characterized by the ratio of the $M_w$ to the $M_n$ which is also referred to as the polydispersity index (PDI) or more simply as polydispersity. A PARPOL of the type disclosed herein may have a PDI from about 1 to about 50, alternatively from about 2 to about 10, alternatively from about 2 to about 5, or alternatively from about 2 to about 3.

The ratio of $M_z$ to the $M_w$ is another indication of the breadth of the MWD of a polymer. A PARPOL of the type described herein may be further characterized by a ratio ($M_z/M_w$) of from about 1.3 to about 15, alternatively from about 1.5 to about 12, or alternatively from about 2 to about 10.

A PARPOL of the type described herein may be a multimodal polymer. Herein, the "modality" of a polymer refers to the form of its molecular weight distribution curve, i.e., the appearance of the graph of the polymer weight fraction, frequency, or number as a function of its molecular weight, as may be displayed by, for example, gel permeation chromatography (GPC). The polymer weight fraction refers to the weight fraction of molecules of a given size. A polymer having a molecular weight distribution curve showing a single peak may be referred to as a unimodal polymer, a polymer having a curve showing two distinct peaks may be referred to as a bimodal or a bimodal-like polymer, a polymer having a curve showing three distinct peaks may be referred to as a trimodal polymer, etc. Polymers having molecular weight distribution curves showing more than one peak may be collectively referred to as multimodal polymers or resins. It is acknowledged that, in some instances, a multimodal polymer may appear to have a single peak via, for example, GPC analysis, when in fact the polymer itself is multimodal. In such instances, overlap of peaks may obscure the presence of other peaks and may imply unimodality, when in fact multimodality is a more accurate representation of the nature of the polymer or polymers.

In an embodiment, the PARPOL is characterized as a bimodal polymer. Such a bimodal PARPOL may display two distinct peaks attributable to a higher molecular weight (HMW) component and a lower molecular weight (LMW) component. In an embodiment, the LMW component has a $M_w$ ranging from about 350 g/mol to about 100,000 g/mol, alternatively from about 1,000 g/mol to about 40,000 g/mol, alternatively from about 10,000 g/mol to about 40,000 g/mol, or alternatively from about 25,000 g/mol to about 40,000 g/mol and is present in the PARPOL composition in an amount of from about 0 weight percent (wt. %) to less than about 100 wt. %, alternatively from about 50 wt. % to about 100 wt. %, or alternatively from about 75% to about 100 wt. %, based on the total polymer weight. In an embodiment, the HMW component has a $M_w$ ranging from about 40,000 g/mol to about 100,000 g/mol, alternatively from about 50,000 g/mol to about 100,000 g/mol, or alternatively from about 75,000 g/mol to about 100,000 g/mol and is present in the PARPOL composition in an amount of from greater than about 0 wt. % to less than about 100 wt. %, alternatively from about 25 wt. % to about 100 wt. %, or alternatively from about 50 wt. % to about 100 wt. %, based on the total polymer weight.

In an embodiment, a PARPOL of the type described herein may be characterized by a melt index, MI, equal to or greater than about 10 dg/min, alternatively equal to or greater than about 50 dg/min, alternatively equal to or greater than about 100 dg/min, or alternatively equal to or greater than about 200 dg/min. The melt index (MI) refers to the amount of a polymer which can be forced through an extrusion rheometer orifice of 0.0825 inch diameter when subjected to a force of 2,160 grams in ten minutes at 190° C., as determined in accordance with ASTM D1238.

In an embodiment, a PARPOL of the type described herein may be characterized by a high load melt index, HLMI, equal to or greater than about 100 dg/min, alternatively in the range of from about 100 dg/min to about 5000 dg/min, alternatively from about 500 dg/min to about 5000 dg/min, or alternatively from about 750 dg/min to about 5000 dg/min. The HLMI represents the rate of flow of a molten polymer through an orifice of 0.0825 inch diameter when subjected to a force of 21,600 grams at 190° C. as determined in accordance with ASTM D1238.

In an embodiment, a PARPOL of the type described herein may be characterized by a shear response in the range of from about 10 to about 500, alternatively from about 10 to about 50, or alternatively from about 10 to about 20. The shear response refers to the ratio of high load melt index to melt index (HLMI/MI).

In an embodiment, a PARPOL of the type described herein may be characterized by a Carreau-Yasuda 'a' parameter in the range of from about 0 to about 2.0, alternatively from about 0.1 to about 1.0, or alternatively from about 0.05 to about 0.8. The Carreau-Yasuda 'a' parameter (CY-a) is defined as the rheological breadth parameter. Rheological breadth refers to the breadth of the transition region between Newtonian and power-law type shear rate for a polymer or the frequency dependence of the viscosity of the polymer. The rheological breadth is a function of the relaxation time distribution of a polymer, which in turn is a function of the polymer molecular structure or architecture. The CY-a parameter may be obtained by assuming the Cox-Merz rule and calculated by fitting flow curves generated in linear-viscoelastic dynamic oscillatory frequency sweep experiments with a modified Carreau-Yasuda (CY) model, which is represented by equation 4:

$$|\eta^*(\omega)| = \eta_o [1 + (\tau_\eta \omega)^a]^{\frac{n-1}{a}} \quad (4)$$

where $|\eta^*(\omega)|$=magnitude of the complex shear viscosity (Pa·s)
$\eta_o$=zero shear viscosity (Pa·s) [defines the Newtonian plateau]
$\omega$=angular frequency of oscillatory shear deformation (i.e., shear rate (1/s))
a=rheological breadth parameter
$\tau_\eta$=viscous relaxation time (s) [describes the location in time of the transition region]

n=power law constant [defines the final slope of the high shear rate region].

To facilitate model fitting, the power law constant n is held at a constant value (i.e., 0.1818). The dynamic shear viscosities may be measured experimentally, and the data may be fit to the CY equation 4 to determine $\eta_o$ values and other rheological parameters. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume* 1, *Fluid Mechanics*, 2nd Edition, John Wiley & Sons (1987), each of which is incorporated by reference herein in its entirety.

The zero shear viscosity refers to the viscosity of the polymer at a zero shear rate and is indicative of the molecular structure of the materials. Further, for polymer melts, the zero shear viscosity is often a useful indicator of processing attributes such as melt strength in blow-molding and foam technologies and bubble stability in film blowing. For example, the higher the zero shear viscosity, the better the melt strength or bubble stability. In an embodiment, a PARPOL of the type described herein may be characterized by a zero shear viscosity ($\eta_o$), defined by equation 4, in the range of from about 1.0E+00 Pa-s to about 1.0E+06 Pa-s, alternatively from about 1.0E+00 Pa-s to about 1.0E+05 Pa-s, or alternatively from about 1.0E+00 Pa-s to about 1.0E+03 Pa-s.

In an embodiment, a PARPOL of the type described herein has a relaxation time ($\tau_n$), defined by Equation (4), in the range of from about 1.0E−03 s to about 1.0E+08 s, alternatively, from about 1.0E−02 s to about 1.2E+04 s, or alternatively, from about 1.0E−02 s to about 1.0E+03 s. The relaxation rate refers to the viscous relaxation times of the polymer and is indicative of a distribution of relaxation times associated with the wide distribution of molecular weights.

A PARPOL of the type disclosed herein may be further characterized by the degree and nature of branching present in the individual components of the polymer composition and/or in the polymer composition as a whole. Short chain branching (SCB) is known for its effects on polymer properties such as stiffness, tensile properties, heat resistance, hardness, permeation resistance, shrinkage, creep resistance, transparency, stress crack resistance, flexibility, impact strength, and the solid state properties of semi-crystalline polymers such as polyethylene. For the purpose of this disclosure, SCB is defined as comprising chains that have a number of carbon atoms ranging from about 1 carbon atom to about 20 carbon atoms, alternatively from about 1 carbon atoms to about 10 carbon atoms, or alternatively from about 1 carbon atoms to about 6 carbon atoms.

SCB content may be determined as the number of SCB per 1,000 carbon atoms (SCB/$10^3$ carbons). In an embodiment, a PARPOL of the type described herein may display short chain branching (for the composition as a whole) per 1,000 carbon atoms in the range of from about 0 carbon to about 40 carbons, alternatively from about 0 carbon to about 35 carbons, or alternatively from about 0 carbon to about 25 carbons. Short-chain branching may be determined using any suitable methodology such as gel permeation chromatography or size exclusion chromatography coupled with Fourier-transform infrared, or gel permeation chromatography or size exclusion chromatography coupled with IR5 detector (Polymer Characterisation SA, Spain).

In an embodiment, a PARPOL of the type described herein may be characterized as a branched polymer wherein the level of long chain branching (LCB) present in the polymer is low. For the purpose of this disclosure, LCB is defined as comprising chains that have a number of carbon atoms ranging from about 50 carbon atoms to about 11,000 carbon atoms, alternatively from about 100 carbon atoms to about 9,000 carbon atoms, or alternatively from about 225 carbon atoms to about 7,200 carbon atoms. Polymer chain branching may be measured using any suitable methodology such as nuclear magnetic resonance (NMR) or size-exclusion chromatography-multiangle light scattering technique (SEC-MALS). Methods for the determination of long chain branching distribution are described in more detail in *Polymer* (2005) Volume 46, Issue 14, Pages 5165-5182, which is incorporated by reference herein in its entirety.

In an embodiment, a PARPOL of the type disclosed herein may be characterized by a high degree of unsaturation when compared to Ziegler or chromium derived polyethylene resins. Without wishing to be limited by theory, generally, there are four types of olefinic groups present in sufficient concentrations in polyethylene polymers to warrant consideration, one or more of which can normally be found in any polyethylene: (i) vinyl unsaturation, R—CH=CH$_2$, which may also be referred to as terminal unsaturation; (ii) transvinylene unsaturation, R—CH=CH—R', which may also be referred to as transinternal unsaturation, or trans unsaturation; and (iii) cis-vinylidene unsaturation and (iv) vinylidene or pendent methylene unsaturation, RR'C=CH$_2$. Vinyl unsaturation may be expressed as the number of vinyl groups present per 1,000 carbon atoms and determined in accordance with ASTM D6248. Both cis- and trans-unsaturation may be expressed as the number of trans-vinylidene groups present per 1,000 carbon atoms and determined in accordance with ASTM D6248. Vinylidene unsaturation may be expressed as the number of cis- or trans-vinylidene groups present per 1,000 carbon atoms and determined in accordance with ASTM D3124. The total degree of unsaturation of a polymer may be calculated as follows: total unsaturation=vinyl unsaturation+cis unsaturation+trans unsaturation+vinylidene unsaturation. The total unsaturation represents the total number of unsaturated groups present per 1,000 total carbon atoms.

In an embodiment, a PARPOL of the type disclosed herein may be characterized by a vinyl unsaturation per 1,000 total carbon atoms of from about 0 to about 10, alternatively from about 0 to about 5, or alternatively from about 0 to about 2. In an embodiment, a PARPOL of the type disclosed herein may be characterized by a trans unsaturation of from about 0 to about 3, alternatively from about 0 to about 2, or alternatively from about 0 to about 1. In an embodiment, a PARPOL of the type disclosed herein may be characterized by a vinylidene unsaturation of from about 0 to about 0.5, alternatively from about 0 to about 0.4, or alternatively from about 0 to about 0.3. In an embodiment, a PARPOL of the type disclosed herein may be characterized by a total unsaturation of from about 0 to about 14, alternatively from about 0 to about 7, or alternatively from about 0 to about 3.

In an embodiment, a PARPOL of the type described herein may be subjected to one or more procedures for increasing the level of long chain branching and/or unsaturation. In an embodiment, a procedure for increasing the level of long chain branching in a PARPOL comprises radical coupling. In an embodiment, a radically coupled resin (RCR) may be produced by reactive extrusion of a mixture comprising a PARPOL of the type disclosed herein, a coupling compound, and an optional coagent.

In an embodiment, the mixture comprises a coupling compound. Coupling compounds suitable for use in the mixture comprise organic peroxides, azides, azo compounds, silanes, or combinations thereof.

Nonlimiting examples of organic peroxides suitable for use in this disclosure include dialkyl peroxides, dicumyl peroxide, di-t-butyl peroxide, 2,5-dimethyl-2,5-di-(t-butylperoxy) hexane (DHBP), diacyl peroxides, dilauroyl peroxide, dibenzoyl peroxide, peroxyesters, t-butyl peroxy-2-ethylhexanoate, OO-(t-butyl)-O-(2-ethylhexyl) peroxycarbonate, t-butyl peroxy-3,5,5-trimethylhexylhexanoate, t-butyl peroxy benzoate, diperoxyketals, diacyl peroxides, t-amyl peroxides, n-butyl-4,4-di-(t-butyl peroxy) valerate, and the like, or combinations thereof.

Nonlimiting examples of azides suitable for use in this disclosure include R—N$_3$, R—C(O)—N$_3$, R—O—C(O)—N$_3$, (RO$_2$)—(PO)—N$_3$, R$_2$P(O)—N$_3$, R$_3$—Si—N$_3$, R—SO$_2$—N$_3$, or combinations thereof, wherein R can be an unsubstituted or inertly substituted alkyl, aryl, ether, siloxane, silane, heterocycle, haloalkyl, haloaryl, or any combination thereof.

Nonlimiting examples of azo compounds suitable for use in this disclosure include R$^1$—N$_2$—R$^2$ compounds, wherein R$^1$ and R$^2$ can each independently be an unsubstituted or inertly substituted alkyl, aryl, ether, siloxane, silane, heterocycle, haloalkyl, haloaryl, or any combination thereof.

In an embodiment, the coupling compound is present in the mixture in an amount of from about 0.001 wt. % to about 10 wt. %, alternatively from about 0.01 wt. % to about 5 wt. %, alternatively from about 0.1 wt. % to about 5 wt. %, or alternatively from about 0.5 wt. % to about 3 wt. %, based on the total weight of the mixture.

In an embodiment, the mixture comprises a coagent. Without wishing to be limited by theory, a coagent is a compound that facilitates the formation of a higher concentration of reactive sites. Many nonproductive reactions such as polymer scission or other deleterious reactions are kinetically favored, and typically only a very high concentration of reactive sites (e.g., radical sites) on the polymer backbone allows for effective product formation to occur at all. Generally, the coagent increases the local concentration of highly reactive groups (e.g., radicals). In an embodiment, the coagent comprises a Type I coagent, a Type II coagent or combinations thereof.

Herein, a Type I coagent refers to polar low molecular weight (e.g., less than about 500 g/mol) compounds which form radicals through addition reactions. In an embodiment, the Type I coagent comprises multifunctional acrylates, multifunctional methacrylates, dimaleimides, or combinations thereof. Examples of Type I coagents suitable for use in the present disclosure include without limitation trimethylolpropane triacrylate, trimethylolpropane trimethacrylate, ethylene glycol diacrylate, N,N'-m-phenylene dimaleimide, zinc diacrylate and zinc dimethacrylate.

Herein, a Type II coagent refers to materials that form radicals primarily through hydrogen abstraction. Type II coagents suitable for use in the present disclosure include without limitation allyl-containing cyanurates, isocyanurates, phthalates, homopolymers of dienes, copolymers of dienes, vinyl aromatics or combinations thereof. Examples of Type II coagents suitable for use in the present disclosure include without limitation triallyl cyanurate (TAC), tri-allyl-iso-cyanurate, pentaerythriol triacrylate, p-benzoquinone, vinyl poly(butadiene), vinyl styrene-butadiene copolymer.

In an embodiment, the optional coagent is present in the mixture in an amount of from about 0 wt. % to about 10 wt. %, alternatively from about 0 wt. % to about 5 wt. %, alternatively from about 0 wt. % to about 1 wt. %, or alternatively from about 0 wt. % to about 0.5 wt. %, based on the total weight of the mixture.

Reactive extrusion is a polymer processing technique that involves the use of a polymer extruder as a chemical reactor in which individual components may be bonded by a chemical reaction while inside the extruder. Typical reactive extruders consist of one or two horizontal screws that may be rotated by the use of a motor attached to one end of a screw. The reactive extruder may be thermostated at a certain temperature across the entire lengths, or it may have a temperature gradient applied across its length, according to a desired temperature profile. Without wishing to be limited by theory, the residence time of a reactive extruder may be defined as the time spent inside the extruder by the components that are fed into the reactive extruder.

In an embodiment, the temperature profile (i.e., temperature gradient applied across its length) during the reactive extrusion process ranges from about 120° C. to about 300° C., alternatively from about 145° C. to about 250° C., alternatively from about 145° C. to about 230° C., or alternatively from about 165° C. to about 215° C.

In an embodiment, the residence time during the reactive extrusion process ranges from about 1 s to about 10 min, alternatively from about 5 s to about 5 min, alternatively from about 10 s to about 3 min, or alternatively from about 10 s to about 2 min.

Reactive extrusion of mixtures of the type disclosed herein is generally thought to result in the formation of free radicals. Free radicals may form on the PARPOL chain, by homolytic cleavage of a C—H bond. Without wishing to be limited theory, homolytic cleavage or homolysis of a covalent bond involves the equal distribution of the 2 electrons forming the covalent bond to each of the two atoms that originally formed the covalent bond, thus forming two free radicals. Thus, subjecting a mixture of the type disclosed herein to reactive extrusion may result in the formation of carbon atom radicals, C●, on the PARPOL chain backbone, via a homolytic cleavage mechanism. Reactive extrusion of a mixture of the type disclosed herein may result in the formation of carbon atom radicals on the PARPOL chain backbone which react with other such species in a carbon-carbon coupling reaction to form a branched polymer having a higher molecular weight than the PARPOL.

During the residence time of the mixture subjected to the reactive extrusion process, homolytic cleavage followed by carbon-carbon coupling reactions of the free radical polymers may occur repeatedly. The product of the reactive extrusion process (i.e., radically coupled resin) may exhibit a highly branched architecture along with a molecular weight that is greater than the PARPOL as depicted in SEC-MALS data (vide infra). In an embodiment, the RCR has a $M_w$ that is greater than that of the PARPOL by about 20% to about 1,000%, alternatively from about 50% to about 800%, alternatively from about 75% to about 700%, or alternatively from about 100% to about 600%, based on the molecular weight of the PARPOL.

In an embodiment, the PARPOL is a homopolymer (e.g., a polyethylene homopolymer) and the product RCR is a radically coupled homopolymer resin and designated $RCR_{homo}$. In another embodiment, the PARPOL is a copolymer (e.g., a copolymer of ethylene and 1-hexene) and the product RCR is a radically coupled copolymer resin and designated $RCR_{cop}$. In yet another embodiment, the PARPOL has a molecular weight of greater than about 20,000 g/mol and the product RCR is a radically coupled higher molecular weight resin $RCR_{HMW}$. It is to be understood that the $RCR_{homo}$, $RCR_{cop}$ and $RCR_{HMW}$ are collectively referred to as RCRs. In an embodiment, a RCR of the type described herein may be characterized by a $M_w$ of from about 50,000 g/mol to about 250,000 g/mol, alternatively from about 60,000 g/mol to about 175,000 g/mol; alternatively from about 65,000 g/mol to about 160,000 g/mol; or alternatively from about 70,000 g/mol to about 150,000 g/mol; a $M_n$ of from about 2,000 g/mol to about 62,500 g/mol, alternatively from about 2,400 g/mol to about 43,750 g/mol; alternatively from about 2,600 g/mol to about 40,000 g/mol; or alternatively from about 2,800 g/mol to about 37,500 g/mol and a $M_z$ of from about 200,000 g/mol to about 3,750,000 g/mol, alternatively from about 240,000 g/mol to about 2,625,000 g/mol; alternatively from about 260,000 g/mol to about 2,400,000 g/mol; or alternatively from about 280,000 g/mol to about 2,250,000 g/mol.

In an embodiment, a RCR of the type described herein may be characterized by a PDI of from about 4 to about 40, alternatively from about 4 to about 20, or alternatively from about 6 to about 18.

In an embodiment, the RCR is a $RCR_{homo}$ and is characterized by a PDI of from about 4 to about 30, alternatively from about 5 to about 25, or alternatively from about 14 to about 25.

In another embodiment, the RCR is an $RCR_{cop}$ and is characterized by a PDI of from about 4 to about 20, alternatively from about 4 to about 15, or alternatively from about 4 to about 10.

In an embodiment, the RCR is a $RCR_{homo}$ and is characterized by a density of from about 0.915 g/cc to about 0.975 g/cc, alternatively from about 0.925 g/cc to about 0.970 g/cc, or alternatively from about 0.930 g/cc to about 0.970 g/cc.

In another embodiment, the RCR is an $RCR_{cop}$ and is characterized by a density of from about 0.93 g/cc to about 0.975 g/cc, alternatively from about 0.94 g/cc to about 0.975 g/cc, alternatively from about 0.95 g/cc to about 0.975 g/cc, or alternatively from about 0.96 g/cc to about 0.975 g/cc.

In an embodiment, the RCR is a $RCR_{homo}$ and is characterized by a melt index, MI, of from about 0 dg/min to about 150 dg/min, alternatively from about 0 dg/min to about 100 dg/min, alternatively from about 0 dg/min to about 75 dg/min, or alternatively from about 0.4 dg/min to about 45 dg/min.

In an embodiment, an RCR of the type described herein may be characterized by a high load melt index, HLMI, in the range of from about 0.1 dg/min to about 500 dg/min, alternatively from about 10 dg/min to about 500 dg/min, or alternatively from about 25 dg/min to about 500 dg/min.

In an embodiment, an RCR of the type described herein may be characterized by a shear response (HLMI/MI) in the range of from about 25 to about 600, alternatively from about 50 to about 500, alternatively from about 75 to about 400, or alternatively from about 90 to about 250.

In an embodiment, an RCR of the type described herein may be characterized by a Carreau-Yasuda 'a' parameter in the range of from about 0.005 to about 2.00, alternatively from about 0.01 to about 1.00, alternatively from about 0.05 to about 0.80, or alternatively from about 0.10 to about 0.50.

In an embodiment, an RCR of the type described herein may be characterized by a zero shear viscosity ($\eta_0$) in the range of from about 1.0E+01 Pa-s to about 9.0E+10 Pa-s, alternatively from about 1.0E+02 Pa-s to about 5.0E+08 Pa-s, alternatively from about 1.0E+03 Pa-s to about 3.0E+07 Pa-s, or alternatively from about 1.0E+03 Pa-s to about 2.0E+06 Pa-s.

In an embodiment, an RCR of the type described herein may be characterized as a branched polymer wherein the level of LCB present in the polymer is elevated, when compared to the level of LCB in the PARPOL. In an embodiment, λ is in the range of from about 0.001 LCB/10³ carbons to about 2 LCB/10³ carbons.

In an embodiment, λ, as measured by NMR for a RCR of the type disclosed herein, is in the range of from about 0.01 LCB/10³ carbons to about 2 LCB/10³ carbons, alternatively from about 0.05 LCB/10³ carbons to about 1.5 LCB/10³ carbons, alternatively from about 0.1 LCB/10³ carbons to about 1.0 LCB/10³ carbons, or alternatively from about 0.2 LCB/10³ carbons to about 0.4 LCB/10³ carbons.

Alternatively, in an embodiment, λ, as measured by SEC-MALS for an RCR of the type disclosed herein, is in the range of from about 0.001 LCB/10³ carbons to about 1.5 LCB/10³ carbons, alternatively from about 0.01 LCB/10³ carbons to about 1.0 LCB/10³ carbons, alternatively from about 0.1 LCB/10³ carbons to about 0.8 LCB/10³ carbons, or alternatively from about 0.1 LCB/10³ carbons to about 0.5 LCB/10³ carbons.

$R_g$ and $M_w$ have a power-law relationship, i.e. $R_g = K * M_w^a$, where K and a are constants. The a-parameter for a linear polymer is always larger than a branched polymer of same type. Under the experimental condition, the a-parameter for the linear control is ca. 0.6. The a-parameter for branched polymers is <0.6. In an embodiment, for an RCR of the type disclosed herein, at $M_w$ in the range of from about 50 kg/mol to about 250 kg/mol, when subjected to SEC-MALS analysis display an a-parameter ranging from about 0.25 to about 0.55, alternatively from about 0.30 to about 0.52, or alternatively from about 0.35 to about 0.49.

In an embodiment, the RCR comprises at least two types of short chain branches. The RCR may comprise ethyl, butyl, hexyl, 4-methylpenyl or octyl short chain branches. In an embodiment, the RCR is an $RCR_{homo}$. In such an embodiment, the $RCR_{homo}$ may be characterized by short chain branching per 1000 carbon atoms in the range of from about 0 to about 40, alternatively from about 0 carbons to about 35, alternatively from about 0 to about 30, or alternatively from about 0 to about 25.

As will be appreciated by one of ordinary skill in the art, SCB in ethylene polymers is typically the result of comonomer incorporation. The comonomers typically employed in the formation of ethylene polymers contain an even number of carbon atoms (e.g., 1-hexene, 1-octene). RCRs of the type disclosed herein are characterized by SCB that is the result of a radical coupling process producing branches that may contain an odd number of carbon atoms. In an embodiment, an RCR of the type disclosed herein contains SCB having an odd carbon atom number in an amount of less than about 10%, alternatively less than about 7%, alternatively less than about 5%, or alternatively less than about 3%.

In an embodiment, an RCR of the type disclosed herein having a $M_w$ ranging from about 50 kg/mol to about 250 kg/mol, may be characterized by a level of vinyl unsaturation per 1000 carbon atoms ranging from about 0 to about 0.6, alternatively from about 0 to about 0.4, or alternatively from about 0 to about 0.3. In an embodiment, an RCR of the type disclosed having a $M_w$ ranging from about 50 kg/mol to about 250 kg/mol may be characterized by a level of trans unsaturation per 1000 carbon atoms ranging from about 0 to about 0.08, alternatively from about or alternatively from about 0 to about 0.05.

In an embodiment, RCRs of the type disclosed herein display an activation energy of from about 30 kJ mol⁻¹ to about 85 kJ mol⁻¹, alternatively from about 35 kJ mol⁻¹ to about 80 kJ mol⁻¹, alternatively from about 35 kJ mol⁻¹ to about 75 kJ mol⁻¹, or alternatively from about 38 kJ mol⁻¹ to about 65 kJ mol⁻¹. In another embodiment, RCRs of the type disclosed herein display an activation energy from about 28 kJ mol⁻¹ to about 85 kJ mol⁻¹, alternatively from about 35 kJ mol⁻¹ to about 60 kJ mol⁻¹, alternatively from about 37 kJ mol⁻¹ to about 55 kJ mol⁻¹, or alternatively from about 37 kJ mol⁻¹ to about 45 kJ mol⁻¹. The flow activation energy (Ea), also sometimes referred to as energy of activation, refers to complex thermorheological behavior and may be calculated from rheological experiments measuring various parameters such as complex viscosities at different temperatures. For example the Ea may be calculated according to an Arrhenius type equation over a limited temperature range, for example from 170 to 210° C., by substituting the complex viscosity η*, and absolute temperature T, in the Arrhenius equation (5)

$$\eta^* = A\exp(-Ea/RT) \quad (5)$$

where A is the pre-exponential factor and R is the gas constant, 8.314 J K⁻¹ mol⁻¹. $E_a$, reflects the sensitivity of polymer melt viscosity to temperature. This is generally viewed as a function of the linear v. network character of the polymer. The molecular weight, the molecular weight distribution, and the degree of chain entanglement are also generally viewed as factors affecting the flow activation energy.

In an embodiment, the polymers of this disclosure are further characterized by a crossover modulus (CM) measured in units of Pascals (P) that is equal to or less than the value $y_{mn}$ where $y_{mn} = 180,000e^{-0.15x}$ and x is the $M_n$ of the PARPOL divided by 1,000. Alternatively, the CM may be equal to or less than the value $y_{mz}$ where $y_{mz} = 193266e^{-0.005535x}$ and x is the $M_z$ of the PARPOL divided by 1,000, and the CM is measured in units of Pa. In an embodiment, the polymers of this disclosure are further characterized by a crossover frequency that is equal to or less than the value $f_{mn}$ where $f_{mn} = 3000e^{-0.25x}$ and x is the $M_n$ divided by 1,000. Alternatively, the crossover frequency may be equal to or less than the value $f_{mz}$ where $f_{mz} = 500e^{-0.01x}$ and x is the $M_z$ of the PARPOL divided by 1,000. The crossover modulus is the value of storage modulus (G') and loss modulus (G") at the crossover frequency ($\omega_c$) where G' and G" are equal and the crossover modulus is measured in Pa. This is determined by graphing the storage modulus and loss modulus as a function of shear rate. The storage modulus in viscoelastic materials measures the stored energy and represents the elastic portion of the material. The loss modulus relates to the energy dissipated as heat and represents the viscous portion related to the amount of energy lost due to viscous flow. This is described in more detail by J. M. Dealy and K. F. Wissbrun in Melt Rheology and Its Role in Plastic Processing, Van Nostrand Reinhold (1990) ISBN: 13:978-1-4615-9740-7, which is incorporated by reference herein.

An RCR of the type disclosed herein may be utilized in any suitable application. For example, RCRs of the type disclosed herein may find utility in non-linear optics, nanomaterials for host-guest encapsulation, fabrication of inorganic-organic hybrids, coatings, lubricants, adhesives, compatibilizers, rheology modifiers, curing additives, dye carrier, dispersants, article production, cast and blown film applications.

EXAMPLES

The disclosure having been generally described, the following examples are given as particular embodiments of the disclosure and to demonstrate the practice and advantages thereof. It is understood that the examples are given by way of illustration and are not intended to limit the specification or the claims in any manner.

Characterization

SEC-MALS Measurement

SEC-MALS is a combined method of size-exclusion chromatography (SEC), also known as gel-permeation chromatography (GPC), with multi-angle light scattering (MALS). A DAWN EOS multi-angle light scattering photometer (Wyatt Technology) was attached to a Waters 150-CV plus GPC system through a transfer line thermally controlled at 145° C. At a set flow rate of 0.7 mL/min, the mobile phase 1,2,4-trichlorobenzene (TCB) containing 0.5 g/L of 2,6-di-tert-buty-1,4-methylphenol (BHT) was eluted through three (3) 7.5 mm×300 mm 20M Mixed A-LS columns (Polymer Labs, now an Agilent Company). PE solutions with nominal concentrations of 1.0 mg/mL were prepared at 150° C. for 3-4 h before being transferred to SEC injection vials sitting in a carousel heated at 145° C. In addition to a concentration chromatogram, seventeen (17) light scattering chromatograms at different scattering angles were acquired for each injection. At each chromatographic slice, both the absolute molecular weight (M) and the root-mean square radius, commonly known as radius of gyration, $R_g$, were obtained from the Debye plot. The linear PE control employed in this study was a high-density polyethylene (HDPE) with a broad molecular weight distribution (MWD) (CPChem Marlex™ 9640). The refractive index increment dn/dc used in this study is 0.097 mL/g for PE in TCB at 135° C.

The DAWN EOS system was calibrated with neat toluene at room temperature to convert the measured voltage to intensity of scattered light. During the calibration, toluene was filtered with 0.02 um filter (Whatman) and directly passed through the flowcell of the MALS. At room temperature, the Rayleigh ratio at the given conditions was given by $1.406 \times 10^{-5}$ cm$^{-1}$. A narrow polystyrene (PS) standard (American Polymer Standards) of MW of 30,000 g/mol and a concentration of 5-10 mg/mL in TCB was employed to normalize the system at 145° C. At the given chromatographic conditions, radius of gyration ($R_g$) of the polystyrene (PS) was estimated to be 5.6 nm using Fox-Flory equation coupled with its Mark-Houwink exponent in the chromatographic conditions. A more detailed description of the SEC-MALS method can be found elsewhere.

Method for the determination of short chain branching is described in more detail in U.S. Pat. No. 8,912,285 B2 and method for the determination of long chain branching distribution are described in more detail in *Polymer* (2005) Volume: 46, Issue: 14, Pages: 5165-5182, which is incorporated by reference herein in its entirety.

Rheology Measurements

Samples for melt viscosity measurement were compression molded at 182° C. for a total of three minutes. The samples were allowed to melt at a relatively low pressure for one minute and then subjected to a high molding pressure for an additional two minutes. The molded samples were then quenched in a cold (room temperature) press. 2 mm×25.4 mm diameter disks were stamped out of the molded slabs for rheological characterization. The fluff samples were stabilized with 0.1 wt. % BHT dispersed in acetone and vacuum dried before molding. Small-strain oscillatory shear measurements were performed on an ARES rheometer (Rheometrics Inc., now TA Instruments) using parallel-plate geometry. The test chamber of the rheometer was blanketed in nitrogen in order to minimize polymer degradation. Upon sample loading and after oven thermal equilibration, the specimens were squeezed between the plates to a 1.6 mm thickness and the excess was trimmed. The dynamic shear viscosities were measured over an angular frequency range of 0.03-100 rad/s. These data were fit to the Carreau-Yasuda (C-Y) equation to determine zero-shear viscosity ($\eta_0$) and other rheological parameters.

Polymerizations were performed on a 2.2 L stainless steel reactor equipped with a marine stirrer rotating at 400 rpm. The reactor was surrounded by a stainless steel jacket through which circulated a stream of hot water that permitted precise temperature control to within half a degree centigrade. The reactor was charged with the prescribed amount of SSA, 0.5 mL of TiBA, and a 1 mg/mL solution of catalyst in toluene, and filled with 1.2 L of isobutane liquid, in that order, under a stream of isobutane vapors at 45° C. Finally, ethylene was added to the reactor to equal the desired pressure, which was maintained during the experiment. In cases where comonomer was employed, 30 mL of 1-hexene were charged into a cylinder attached to the reactor manifold under isobutane vapors and introduced by pressuring into the reactor with the ethylene feed. After the allotted time, the ethylene flow was stopped and the reactor was slowly depressurized and opened to recover the granular polymer powder. In all cases, the reactor was clean with no indication of any wall scale, coating or other forms of fouling. The polymer powder was then removed and weighed, and the activity was determined from this weight and the measured time based on the amount of catalyst charged and this data is presented in Table 13.

Example 1

A PE PARPOL of the type disclosed herein was obtained using a metallocene catalyst compound having Structure I:

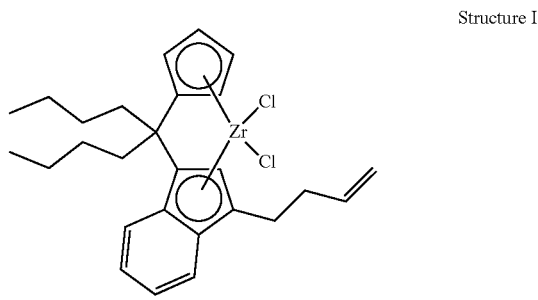

Structure I

The conditions used for each polymerization reaction, along with the yield and the melt index for the resulting PE polymers, designated Samples P1-P3 and Samples 1-6, are summarized in Table 13, Table 2, and Table 3.

TABLE 1

| Sample No. | Catalyst/ mg | m-SSA/ mg | reactor pressure/ psi | T/° C. | T/min | Yield/g | Activity/ kg/g(cat)/hr | Density/ g mL$^{-1}$ | MI | HLMI |
|---|---|---|---|---|---|---|---|---|---|---|
| P1 | 3 | 72.3 | 420 | 95 | 50 | 164 | 65.6 | 0.9574 | >200 | >500 |
| P2 | 3 | 74.9 | 340 | 80 | 50 | 113 | 45.2 | 0.9375 | >200 | >500 |
| P3 | 3 | 102.2 | 340 | 80 | 100 | 172 | 34.4 | 0.9309 | >200 | >500 |

TABLE 2

| Sample No. | MI g/10 min. | $M_n$/1000 g/mol. | $M_w$/1000 g/mol. | $M_w/M_n$ |
|---|---|---|---|---|
| P1 | >200 | 9.2 | 19.7 | 2.2 |
| P2 | >200 | 8.7 | 20.6 | 2.4 |
| P3 | >200 | 11.3 | 25.1 | 2.2 |

TABLE 3

| Sample No. | Metallocene [mg] | Time [min] | Temp. [° C.] | Reactor Pressure [psi] | Ethylene Conc. [mol. %] | Activator-support Type | Activator-support [mg] | TIBA [mmol] | Solid PE [g] | MI g/10 min. |
|---|---|---|---|---|---|---|---|---|---|---|
| 1 | 2 | 30 | 95 | 420 | 14.0 | F-SSA | 200 | 0.6 | 162 | >200 |
| 2 | 2 | 30 | 95 | 420 | 14.0 | M-SSA | 100 | 0.4 | 211 | >200 |
| 3 | 2 | 30 | 95 | 420 | 14.0 | S-SSA | 100 | 0.4 | 66 | >200 |
| 4 | 2 | 60 | 95 | 310 | 5.1 | M-SSA | 100 | 0.4 | 28.0 | 143.3 |
| 5 | 2.6 | 30 | 90 | 450 | 19.0 | S-SSA | 100 | 0.5 | 255 | >200 |
| 6 | 2 | 30 | 80 | 340 | 14.4 | M-SSA | 100 | 0.4 | 155.0 | 68.4 |

The activator support used in conjunction with the metallocene catalyst was a chemically treated solid oxide support of the type disclosed herein where F-SSA and M-SSA designates fluoride silica-alumina solid oxide and S-SSA designates a sulfated solid oxide. Triisobutylaluminum (TIBA) was the cocatalyst in all cases. Table 2 presents the melt index and molecular weight characteristics for samples P1-P3.

Samples 1-6 were also characterized for the presence and the type of SCB by $^{13}$C NMR spectroscopy. The results of these characterizations are summarized in Table 4.

TABLE 4

| Sample No. | Me (wt. %) | Et (wt. %) | Bu (wt. %) | SCB/1000 C |
|---|---|---|---|---|
| 1 | 0.03 | 1.2 | 0.02 | 3.1 |
| 2 | 0.03 | 1.2 | 0.02 | 3.1 |
| 3 | 0.02 | 1.19 | 0 | 3.1 |
| 4 | 0.08 | 1.09 | 0.28 | 3.4 |
| 5 | 0.01 | 1.27 | 0 | 3.2 |
| 6 | 0.02 | 1.52 | 0.13 | 4.1 |

The results summarized in Table 4 indicate the type of SCB did not differ substantially from one sample to another. The Me and Bu SCBs were slightly elevated for Sample 4 (0.08 wt. % and 0.28 wt. %, respectively), when compared to all the other samples. Sample 6 displays the highest number of Et SCBs (1.52 wt. %). A comparison of the overall in situ SCB for all samples demonstrated that the level of SCB ranged from 3.1 to 4.1 SCB/10$^3$ carbons, with the highest level of branching observed for Sample 6. The vinylidene unsaturation is fairly similar for all samples. The vinyl and trans unsaturation, as well as the total unsaturation is presented in Table 5.

TABLE 5

| Sample No. | Vinyl/ 1000 C | Vinylidene 1000 C | Cis/ 1000 C | Trans/ 1000 C | Total (Vinyl + Vinylidene + Trans)/1000 C |
|---|---|---|---|---|---|
| 1 | 1.36 | 0.16 | 0.00 | 0.34 | 1.86 |
| 2 | 1.59 | 0.17 | 0.00 | 0.29 | 2.05 |
| 3 | 1.09 | 0.13 | 0.00 | 0.29 | 1.51 |
| 4 | 1.55 | 0.11 | 0.00 | 0.59 | 2.25 |
| 5 | 0.93 | 0.18 | 0.00 | 0.14 | 1.25 |
| 6 | 0.79 | 0.23 | 0.00 | 0.15 | 1.17 |

A PE sample, designated Sample 7, was prepared using a chromium-based catalyst (0.1387 g) which was reacted with ethylene monomer at 100° C. and 300 psi for 43 minutes. Various properties of Sample 7 are presented in Table 6.

TABLE 6

| Sample No. | Catalyst Charge | Polymer Yield [g] | MI g/10 min. | $M_n$/1000 g/mol. | $M_w$/1000 g/mol. | $M_w/M_n$ |
|---|---|---|---|---|---|---|
| 7 | 0.1387 | 31 | 67.3 | 7.5 | 50.7 | 6.7 |

The $M_w$/1,000 of Sample 7 was fairly large ($M_w$=50.7 kg/mol) when compared to the $M_w$/1,000 of the metallocene-based polymers of example 1 (i.e., Samples 1-6). Sample 7 also displayed a large PDI ($M_w/M_n$ of 6.7) which was about three times larger than the PDIs observed for the metallocene-based polymers of example 1.

Example 2

An RCR of the type disclosed herein was prepared and the properties of the resin investigated. A PE PARPOL of the type described in Example 1, with a MI greater than 200 g/10 min. and a $M_w$ in the range of 17-18 kg/mol, were fed along with a coupling compound, 2,5-dimethyl-2,5-di-(t- butylperoxy) hexane (DHBP), into a twin-screw microcompounding extruder, for example DACA's 5 cc microcompounding extruder, or DSM-Explore's 15 cc microcompounding extruder, having a divisible extruder barrel. In all examples to follow, DHBP was the coupling compound utilized in the preparation of the RCR unless otherwise noted. The extrusion temperature profile was from 190° C. to 215° C., and the residence time was 120 s. These temperature and residence time conditions ensured that greater than 97% of the DHBP decomposed while in the extruder. The resulting RCR had an MI that was less than 2 g/10 min. and a HLMI greater than 7 g/10 min., with a $M_w$ ranging from 68 to 130 kg/mol. High load melt index (HLMI, g/10 min) was determined in accordance with ASTM D1238 condition E at 190° C. with a 21,600 gram weight.

Polyethylene samples and prescribed peroxide amounts were charged into a small container and mechanically agitated/mixed for several minutes to affect impregnation of the peroxide. The impregnated fluff was charged into the microcompounding extruder, used in recirculation mode, in 1.0-1.5 g portions. After the prescribed residence time was completed, the instrument was switched to continuous extrusion mode and the polymer was extruded. The strands were collected and pelletized. Prior to sample collections and between experiments, 3 to 10 grams of material were extruded and used to remove any contaminants from the extruder and prevent cross-contamination between samples.

Example 3

The properties of an $RCR_{homo}$ were investigated. Five $RCR_{homo}$ samples, designated Samples 8-12, were prepared by reactive extrusion of PARPOL, a PE homopolymer, in the presence of DHBP. Table 7 provides the amount of DHBP utilized to prepare each sample and various properties of the sample. Also presented as a comparative are the values of these properties for the PARPOL, designated C1, used to prepare the samples.

TABLE 7

| Sample No. | DHBP [wt. %] | $M_n$/1000 g/mol | $M_w$/1000 g/mol | $M_w/M_n$ | Density g/ml | MI g/10 min. | HLMI g/10 min. |
|---|---|---|---|---|---|---|---|
| C1 | — | 7.13 | 17.01 | 2.39 | 0.9574 | >200 | >500 |
| 8 | 1.04 | 13.43 | 79.59 | 5.93 | 0.9490 | 1.2 | 81.7 |
| 9 | 1.20 | 14.55 | 75.73 | 5.20 | 0.9495 | 0.7 | 71.4 |
| 10 | 1.30 | 14.41 | 73.82 | 5.13 | 0.9490 | 0.2 | 42.2 |
| 11 | 1.40 | 13.88 | 70.69 | 5.09 | 0.9490 | 0.1 | 20.9 |
| 12 | 1.50 | 13.47 | 68.59 | 5.09 | 0.9473 | 0 | 14.1 |

The $M_n$/1,000 for the $RCR_{homo}$ samples ($M_n$=13-14 kg/mol) was independent of the amount of coupling agent used in the reactive extrusion process, and was about twice as large as the $M_n$/1,000 of the PARPOL ($M_n$=7.13 kg/mol). The $M_w$/1,000 for the $RCR_{homo}$ samples ($M_w$=69-80 kg/mol) was also independent of the amount of the coupling agent used, and was 4-5 times larger than the $M_w$/1,000 of the PARPOL, sample C1 ($M_w$=17.01 kg/mol).

Figure 2:
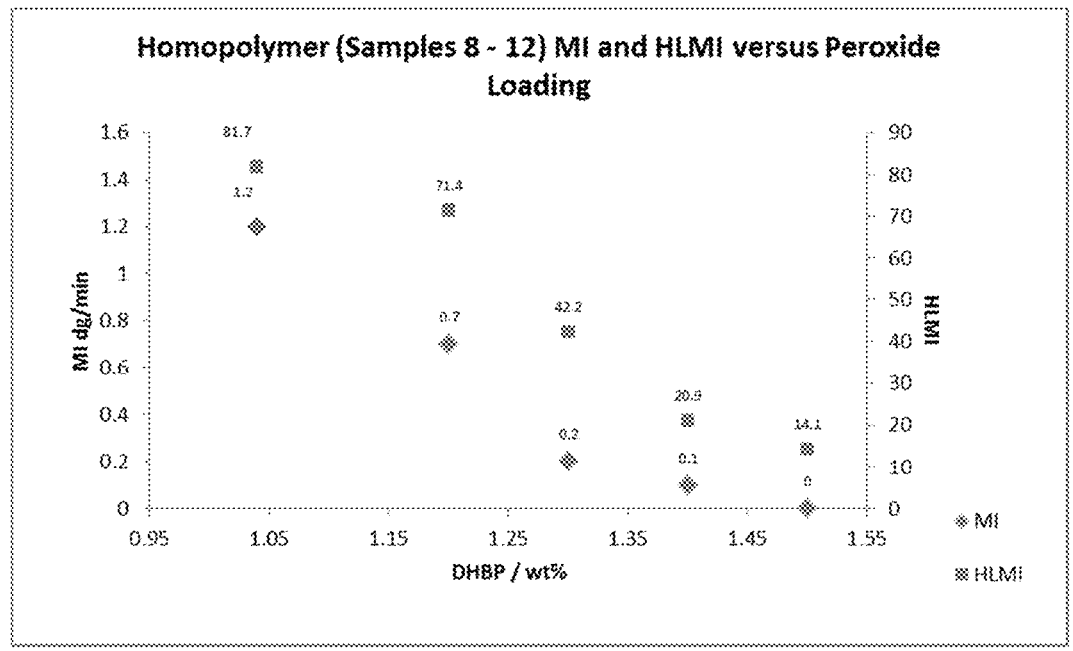
FIG. 2 is a plot of the variation of the melt index and high load melt index with peroxide loading for the samples from Example 3.

The PDI ($M_w/M_n$) of the $RCR_{homo}$ samples appeared to slightly decrease with an increase in the amount of DHBP used, from a PDI of 5.93 in the case of Sample 8 to a PDI of 5.09 in the case of Sample 12. In all cases, the PDI for the $RCR_{homo}$ samples was more than twice as large as the PDI for the parent homopolymer (2.39). The molecular weight distribution profile of Samples 8-12 and C1 are plotted in FIG. 1. The results demonstrate the $RCR_{homo}$ samples (i.e., samples 8-12) had a larger PDI than the parent polymer (i.e., sample C1). The change in MI from the PARPOL to $RCR_{homo}$ is shown in FIG. 2.

Figure 3:
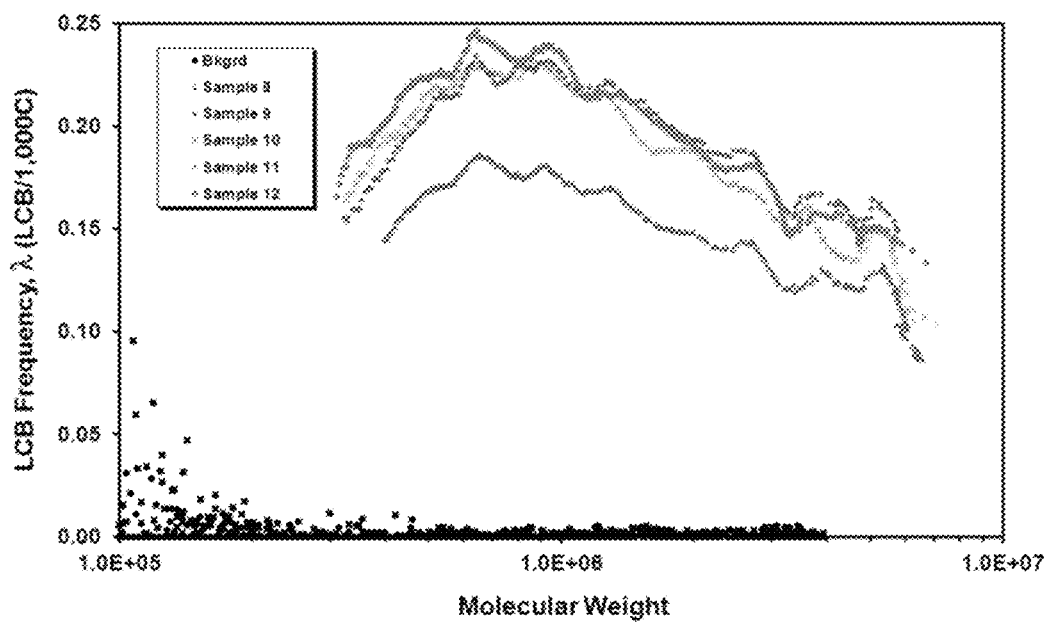
FIG. 3 is the SEC-MALS analysis of the samples from Example 3.
Figure 4:
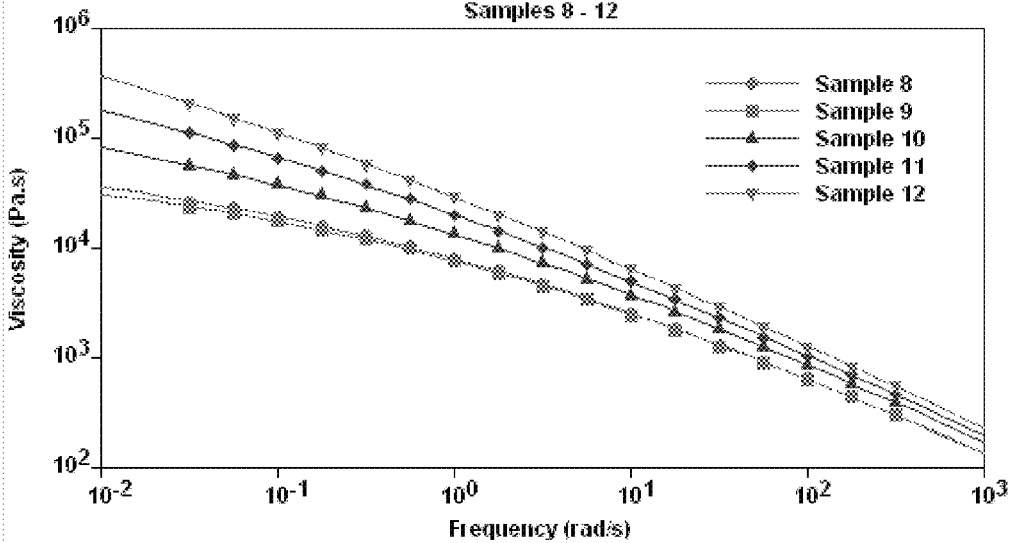
FIG. 4 is a plot of the dynamic melt viscosity of the samples from Example 3.

LCB distribution profiles for $RCR_{homo}$ samples 8-12 were determined using Eqs. 5 and 6 and are shown in FIG. 3. Rheology was employed for further study of the resins listed in FIG. 4. The relationship between $\eta_o$ and $M_w$/1,000 for the $RCR_{homo}$ samples is plotted in FIG. 5. Note that the black solid line in FIG. 6 is the 3.4-power law line. The Arnett 3.4-power law is described by equation 5:

$$\eta_o = kM_w^{3.4} \quad (5)$$

where $\eta_o$=zero shear viscosity (Pa·s) [defines the Newtonian plateau]

k=Arnett law constant $M_w$=weight average molecular weight (g/mol).

and represents the expected dependence of zero shear viscosity for linear polymers when plotted against the weight average molecular weight. The $RCR_{homo}$ samples are characterized by a rheological behavior that can be described as deviating significantly from the Arnett 3.4-power law FIG. 5. The melt zero-shear viscosities for the $RCR_{homo}$ samples are several orders of magnitude greater than that of a linear non-branched polymer of the same $M_w$, which is what the Arnett 3.4-power law line describes.

A statistic commonly used to quantify LCB content is $\alpha$, the fraction of the total carbons that are long-branch vertexes. A more detailed description of LCBs, $\alpha$, long-branch vertexes may be found in J. Janzen and R. H. Colby, *J. Mol. Structure*, 485-6, p. 569 (1999), which is incorporated by reference herein in its entirety. $\alpha$ is defined by equation 6:

$$\alpha = \frac{\upsilon_3}{M_W/M_0} \quad (6)$$

where $\upsilon_3$=number of long branch vertexes $M_w$=weight average molecular weight (g/mol)

$M_0$=molecular weight of repeating unit (Da).

Figure 5:
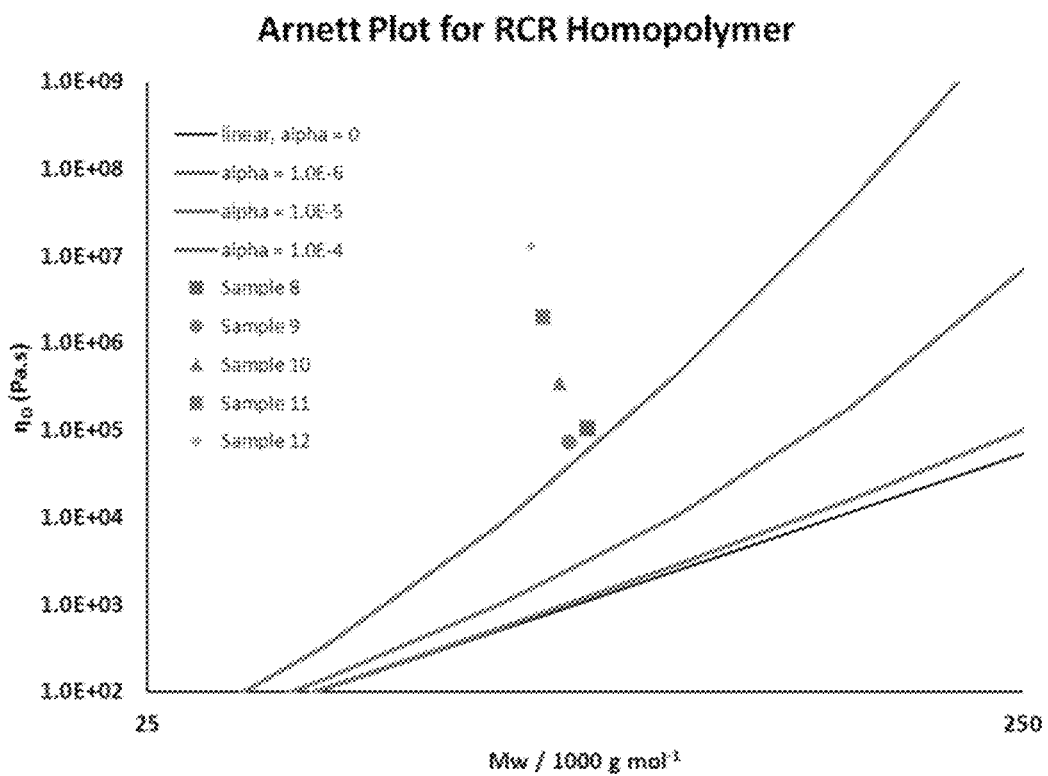
FIG. 5 is a plot of the dynamic melt viscosity vs. frequency of the samples from Example 3.
Figure 6:
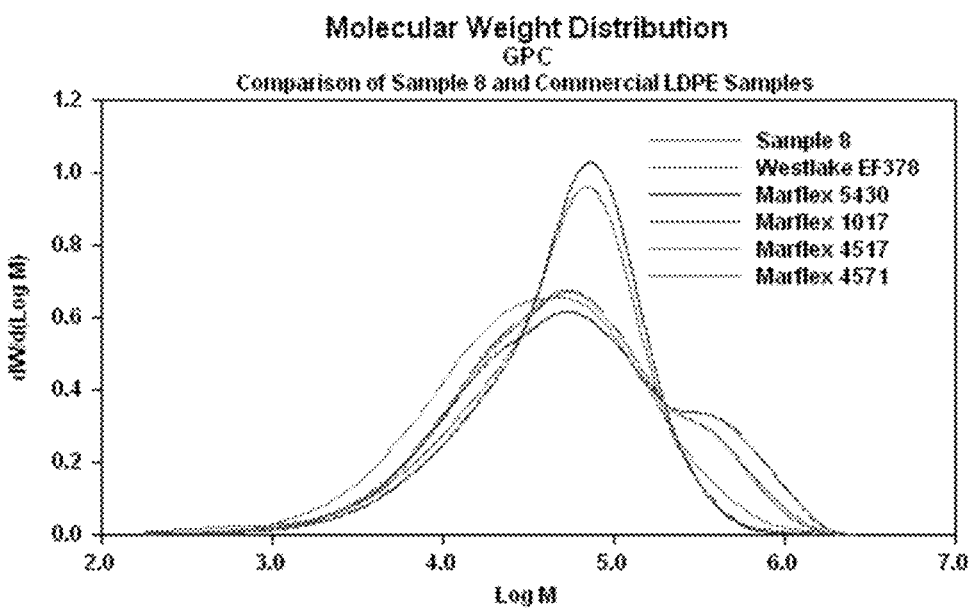
FIG. 6 is a comparison of the molecular weight of a sample from Example 3 with commercial LDPE resins.

For linear or mostly linear polymers, when $\alpha$=0, i.e., there are no long branch vertexes present, the Arnett 3.4-power law applies, as seen in FIG. 5. When $\alpha \neq 0$, i.e., there are long branch vertexes present, the Arnett 3.4-power law no longer applies, and there is a positive deviation from the Arnett 3.4-power law: the higher the number of long branch vertexes present, the higher the $\alpha$ value, the higher the deviation. When an exceptionally high level of long-chain branching is reached, a negative deviation from the Arnett 3.4-power law occurs. Referring to FIG. 5, the higher the peroxide loading used in preparation of the $RCR_{homo}$ samples, the higher the positive deviation from the Arnett 3.4-power law, meaning the higher the number of long branch vertexes present.

$RCR_{homo}$ Comparison to Commercially Available Low Density Polyethylene (LDPE) Resins The properties of $RCR_{homo}$ sample 8 were compared to the properties of five commercially available low density polyethylene (LDPE) resins: WESTLAKE EF378 LDPE, MARFLEX 5430 LDPE, MARFLEX 1017 LDPE, MARFLEX 4517 LDPE, and MARFLEX 4751 LDPE. WESTLAKE EF378 LDPE, MARFLEX 5430 LDPE, and MARFLEX 4571 LDPE are low density polyethylene resins for cast film applications. MARFLEX 1017 LDPE and MARFLEX 4517 LDPE are extrusion coating grade low density polyethylene resins. WESTLAKE EF378 LDPE is suggested for cast film applications and is available from Westlake Chemicals. MARFLEX 5430 LDPE, MARFLEX 1017 LDPE, MARFLEX 4517 LDPE, and MARFLEX 4571 LDPE are available from Chevron Phillips Chemical Company, LP.

Figure 7:
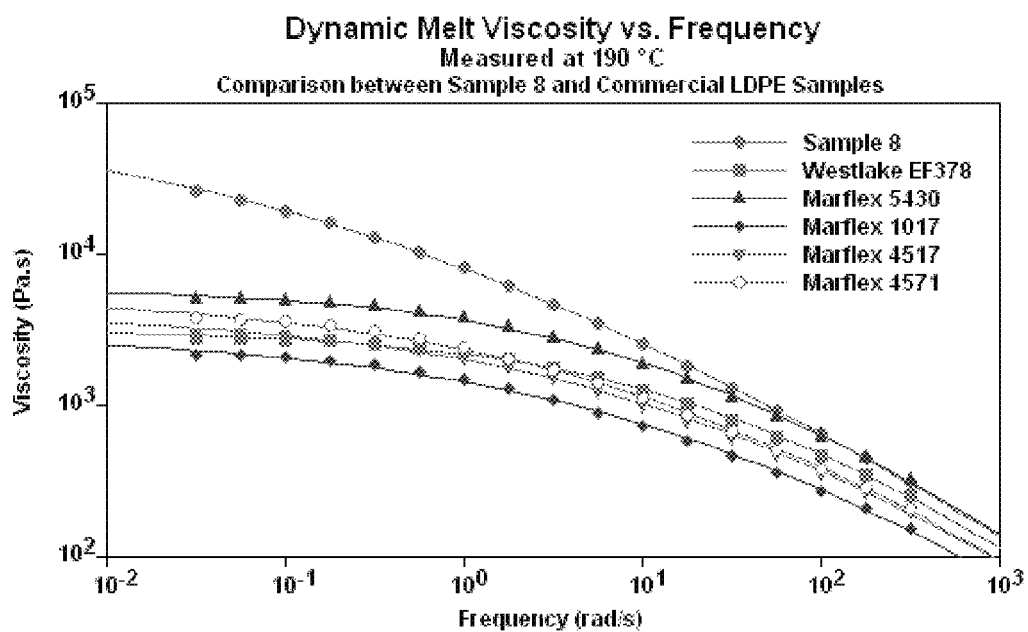
FIG. 7 is a comparison of the dynamic melt viscosity of a sample from Example 3 with commercial LDPE resins.

FIG. 6 is a plot of the molecular weight distribution profiles of $RCR_{homo}$ Sample 8 and the five commercial LDPE resins. Dynamic rheology curves for $RCR_{homo}$ Sample 8 and the five LDPE resins are presented in FIG. 7. As shown in FIG. 7, the data for each of the samples can be fitted to the C-Y equation very well. The C-Y fitting curves are the solid lines, while the data points represent the experimentally collected data.

Figure 8:
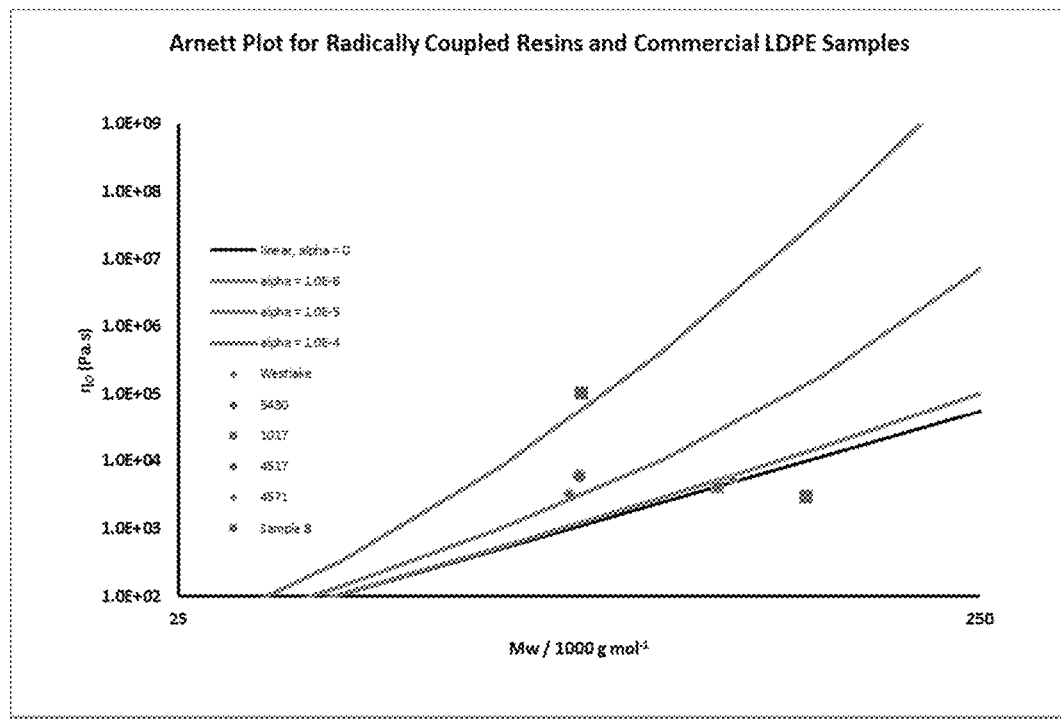
FIG. 8 is a comparison of the plot of zero-shear viscosity as a function of weight average molecular weight of a sample from Example 3 and commercial LDPE resins.

FIG. 8 presents plots of the melt zero-shear viscosity as a function of the $M_w$ for $RCR_{homo}$ Sample 8 and the LDPE resins. Rheological evidence for the presence of hyperbranching in polyethylene, as is the case for LDPE, involves the negative deviation from the Arnett 3.4-power law. Such a deviation would indicate that polymer chains in the melt have extremely poor entanglement with surrounding chains due to the presence of heavily long-chain branched material, and would result in reduced melt zero-shear viscosities. In FIG. 6, when $\alpha=0$, i.e., it is expected that there are no long branch vertexes present, and that the Arnett 3.4-power law applies; two of the commercial autoclave LDPE samples (i.e., MARFLEX 4517, MARFLEX 4571) fall on this line, despite their high levels of long chain branching. When $\alpha>0$, i.e., there are long branch vertexes present, the Arnett 3.4-power law no longer applies, and there is a positive deviation from the Arnett 3.4-power law: the higher the number of long branch vertexes present, the higher the α value, the higher the deviation. This is the case for two of the commercial LDPE samples (i.e., WESTLAKE EF378, MARFLEX 5430) and for $RCR_{homo}$ sample 8. One of the commercial samples (i.e., MARFLEX 1017) displays the most pronounced negative deviation from the Arnett 3.4-power law. For all the commercial LDPE examples, the amount of LCB, as measured by SEC-MALS is underestimated by several orders of magnitude. This underestimation of long chain branching in the Arnett plot is a sign of hyperbranching, where the high amounts of LCB limit chain entanglement.

Example 4

Seven $RCR_{cop}$ samples, designated samples 13 to 19, were prepared and their properties investigated. The PARPOL for each sample, indicated in Table 8, was either copolymer 2 which was a copolymer of ethylene and 1-hexene of 0.9375 g/mL density or copolymer 3 which was a copolymer of ethylene and 1-hexene of 0.9264 g/mL density. Copolymer 2 and copolymer 3 are experimental resins produced via a slurry batch reactor as described under Polymerization Reactor. Various properties of the PARPOLs and $RCR_{cop}$ samples are also presented in Table 8.

TABLE 8

| Sample No. | Base Resin | DHBP [wt. %] | $M_n$/1000 g/mol | $M_w$/1000 g/mol | $M_w/M_n$ g/mol | Density g/ml | MI g/10 min. | HLMI g/10 min. |
|---|---|---|---|---|---|---|---|---|
| C2 | — | — | 7.53 | 18.01 | 2.39 | 0.9375 | >200 | >200 |
| C3 | — | — | 6.33 | 17.94 | 2.83 | 0.9264 | >200 | >200 |
| 13 | C2 | 1.20 | 14.47 | 72.19 | 4.99 | 0.9373 | 1.7 | 56.4 |
| 14 | C2 | 1.30 | 15.16 | 75.6 | 4.99 | 0.9373 | 0.3 | 51.2 |
| 15 | C2 | 1.40 | 13.56 | 71.7 | 5.29 | 0.9360 | 0.3 | 22.7 |
| 16 | C2 | 1.60 | 14.29 | 70.56 | 4.94 | 0.9371 | 0 | 10.4 |
| 17 | C2 | 1.70 | 14.92 | 75.63 | 5.07 | 0.9377 | 0 | 7.2 |
| 18 | C3 | 2.00 | 11.17 | 69.53 | 6.22 | 0.9264 | 0.8 | 130.1 |
| 19 | C3 | 2.10 | — | — | — | — | 0.3 | 50.3 |

Figure 9:
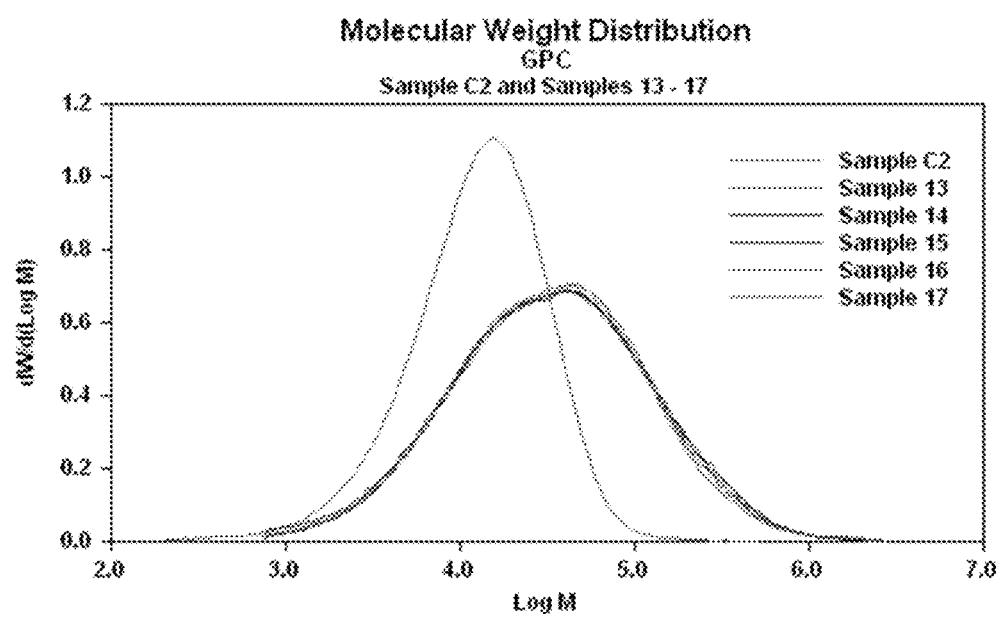
FIG. 9 is a plot of the molecular weight distribution profile of samples from Example 4.

The $M_n$/1,000 for the $RCR_{cop}$ was independent of the amount of the coupling agent used in the reactive extrusion process, and was about twice as large as the $M_n$/1,000 for the PARPOL ($M_n$=6-7 kg/mol). The $M_w$/1,000 for the $RCR_{cop}$ samples was also independent of the amount of the coupling agent used, and it was about 4 times larger than $M_w$/1,000 for the PARPOL ($M_w$=18 kg/mol). The changes in molecular weight between C2 and samples 13-17 are depicted in FIG. 9.

Figure 10:
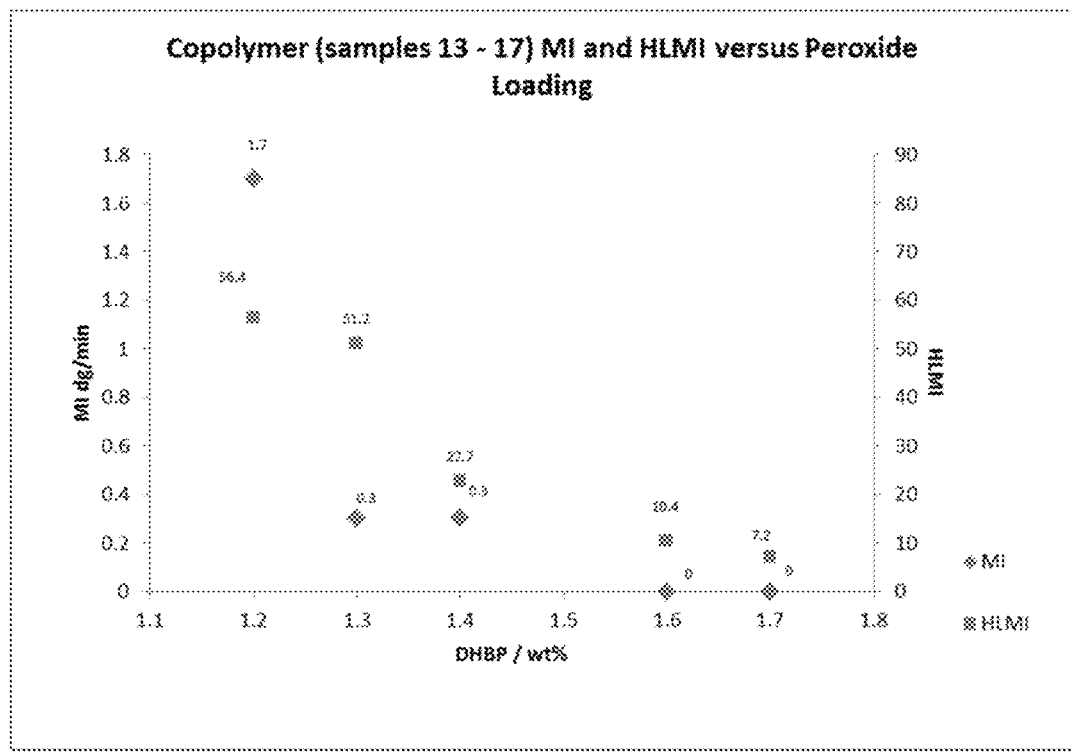
FIG. 10 is a plot of the variation of the melt index and high load melt index with peroxide loading of samples from Example 4.

The MI and HLMI values were high for the PARPOL (>200 g·10 min.), and decreased for the $RCR_{cop}$ samples. The peroxide loading during the reactive extrusion process influenced the MI and HLMI values in an inversely proportional manner, see Table 8. The higher the DHBP loading, the lower the MI and HLMI values for the $RCR_{cop}$ samples. The change in MI and HLMI with DHBP loading for samples 13-17 are shown in FIG. 10. However, when comparing the $RCR_{homo}$ samples of Example 3 the $RCR_{cop}$ samples required greater amounts of peroxide to achieve similar MI and HLMI values.

Figure 11:
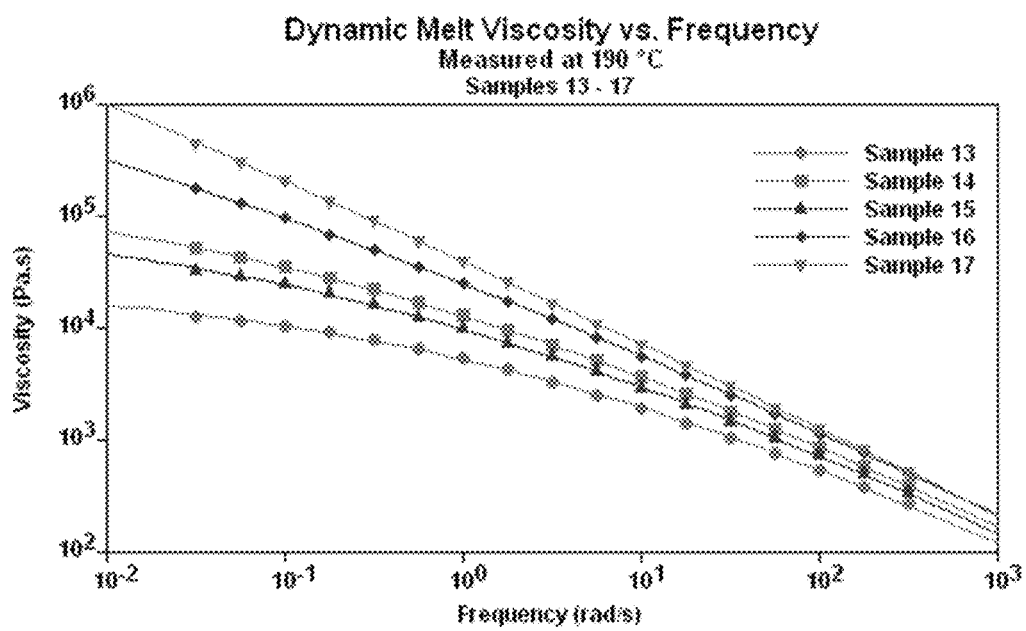
FIG. 11 is a plot of the dynamic melt viscosity of samples from Example 3.
Figure 12:
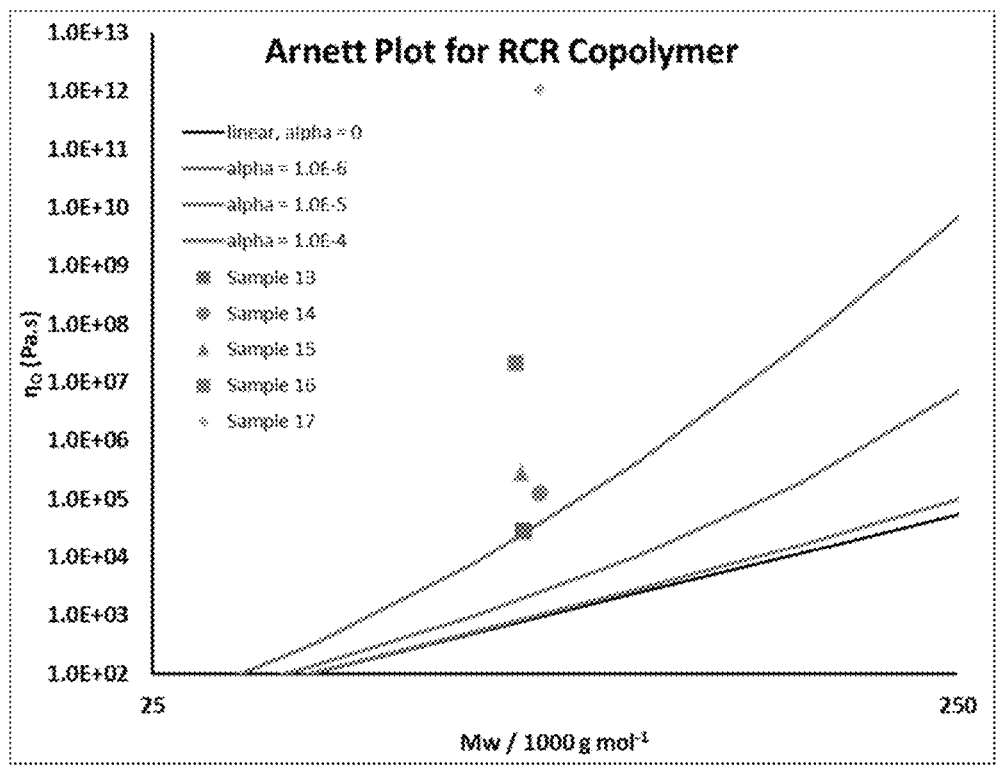
FIG. 12 is a plot of the dynamic melt viscosity vs. frequency of samples from Example 4.

Dynamic rheology curves for $RCR_{cop}$ Samples 13-17 are presented in FIG. 11. As shown in FIG. 11, the data for each of the samples can be fitted to the C-Y equation very well. The C-Y fitting curves are the solid lines, while the data points represent the experimentally collected data. FIG. 12 presents plots of the melt zero-shear viscosity as a function of the $M_w$ for $RCR_{cop}$ Samples 13-17.

Example 5

The properties of four $RCR_{HMW}$ samples of the type disclosed herein were investigated. The samples, designated samples 20-28, were prepared from a PARPOL which was a PE polymer with a molecular weight of 26,500 g mol$^{-1}$, designated C4. Various properties of the RCR$_{HMW}$ are displayed in Table 9.

TABLE 9

| Sample | DHBP [wt. %] | $M_n$/1000 g/mol | $M_w$/1000 g/mol | $M_w/M_n$ | Density g/cc | MI g/10 min. | HLMI g/10 min. |
|---|---|---|---|---|---|---|---|
| C4 | — | 6.91 | 26.50 | 3.84 | 0.9737 | >200 | >200 |
| 20 | 1.40 | 4.39 | 79.50 | 18.11 | 0.9708 | 18.1 | >200 |
| 21 | 1.50 | 5.07 | 81.70 | 16.10 | 0.9711 | 16.1 | >200 |
| 22 | 1.90 | 4.85 | 95.30 | 19.65 | 0.9715 | 7.3 | >200 |
| 23 | 2.00 | 5.20 | 98.80 | 18.99 | 0.9715 | 6.3 | >200 |
| 24 | 2.30 | 5.27 | 108.70 | 20.65 | 0.9726 | 3.8 | >200 |
| 25 | 2.50 | 5.41 | 95.60 | 17.66 | 0.9729 | 2.9 | >200 |
| 26 | 2.80 | 5.65 | 94.60 | 16.74 | 0.9741 | 1.9 | 179.9 |
| 27 | 3.10 | 6.17 | 84.30 | 14.03 | 0.9740 | 0.8 | 121.0 |
| 28 | 3.40 | 6.91 | 81.90 | 13.27 | 0.9746 | 0.4 | 74.6 |

The $M_n$/1,000 for the RCR$_{HMW}$ samples ($M_n$=4-5 kg/mol) was independent of the amount of the coupling agent used in the reactive extrusion process however, the $M_n$/1,000 was lower for the RCR$_{HMW}$ samples than for the PARPOL, Sample C4 ($M_n$=7 kg/mol).

Figure 13:
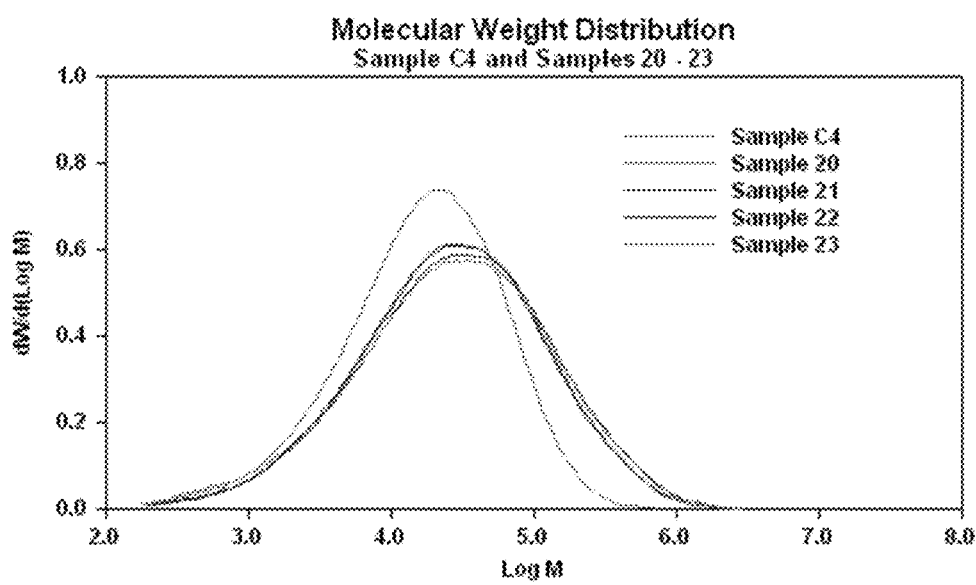
FIG. 13 is a plot of the molecular weight distribution profile of samples from Example 5.

The $M_w$/1,000 of the RCR$_{HMW}$ samples was dependent on the amount of the coupling agent used with the $M_w$/1,000 increasing with increasing amounts of coupling agent (i.e., DHBP). The change in $M_w$/1,000 as a result of the radical coupling process for Samples C4 and 20-23 is shown in FIG. 13.

Figure 14:
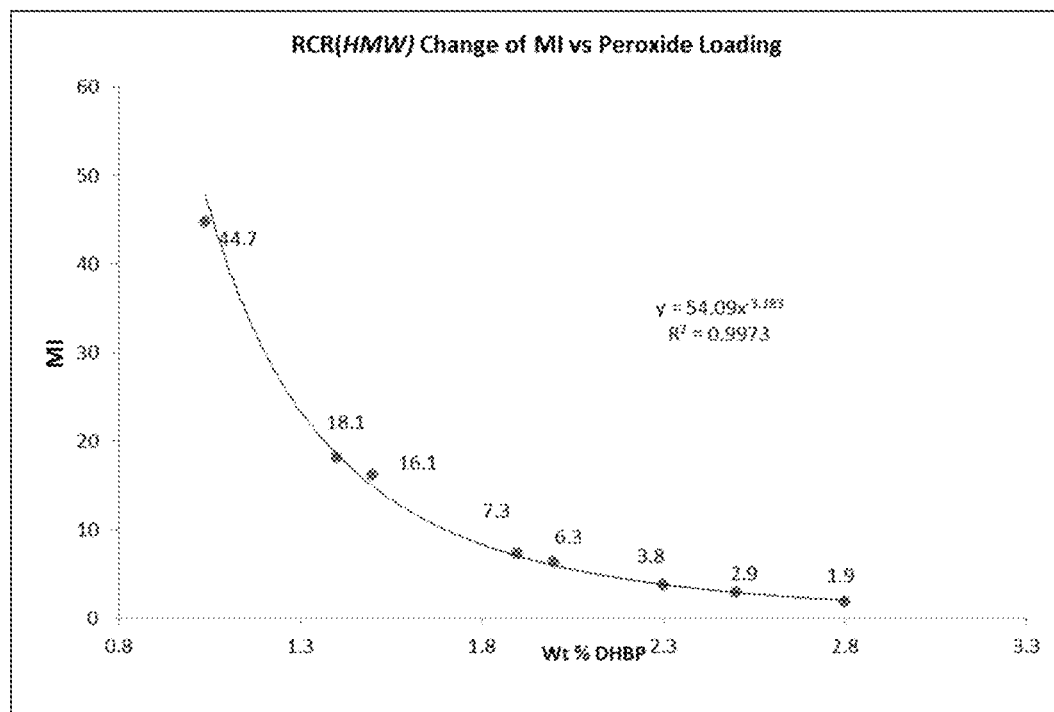
FIG. 14 is a plot of the variation of the melt index with peroxide loading for the samples from Example 5.

The PDI ($M_w/M_n$) of the RCR$_{HMW}$ samples were fairly independent of the amount of DHBP used. The MI and HLMI of Sample C4 was higher (>200 g/10 min.) than that of the RCR$_{HMW}$ samples. The amount of peroxide used influenced the MI in an inversely proportional manner, as shown in FIG. 14. The higher the DHBP loading, the lower the MI values for the RCR$_{HMW}$ samples. The curve in FIG. 14 indicates an exponential increase in the MI with the decrease in the amount of peroxide used.

Figure 15:
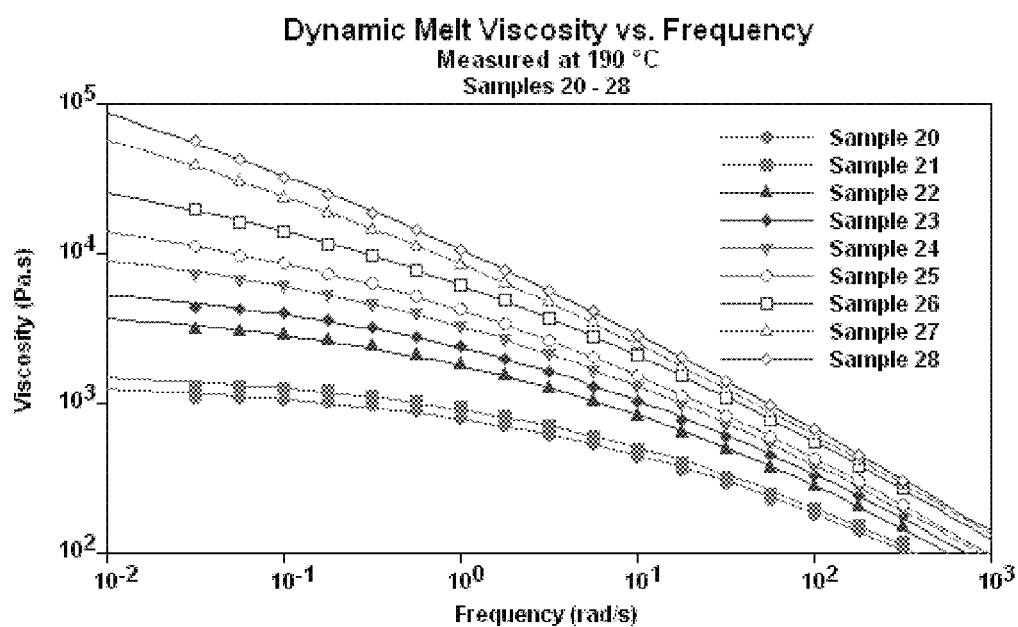
FIG. 15 is a plot of the dynamic melt viscosity of samples from Example 5.

Dynamic rheology curves for RCR$_{HMW}$ Samples 20-28 are presented in FIG. 15. As shown in FIG. 15, the data for each of the samples can be fitted to the C-Y equation very well. The C-Y fitting curves are the solid lines, while the data points represent the experimentally collected data. FIG. 15 presents plots of the melt zero-shear viscosity for RCR$_{HMW}$ Samples 20-28.

Figure 16:
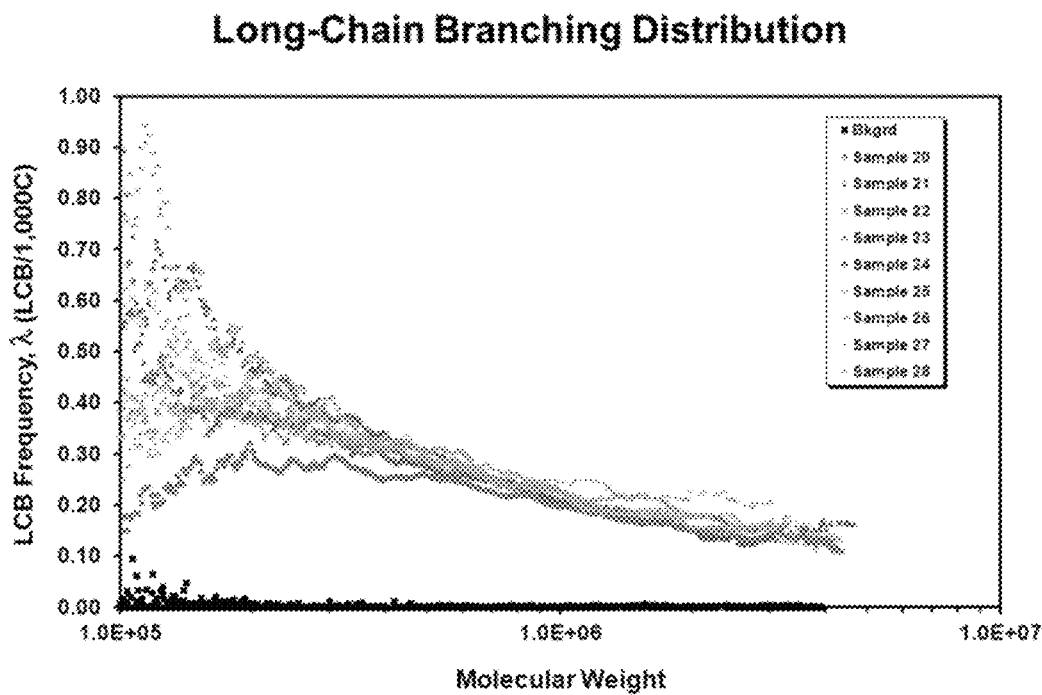
FIG. 16 is the SEC-MALS analysis of samples from Example 5.

The amount of LCB, as measured by SEC-MALS, for RCR$_{HMW}$ is shown in FIG. 16.

Comparison to Commercially Available Low Density Polyethylene (LDPE) Resins

The properties of RCR$_{HMW}$ samples were compared to the properties of the LDPE resins: WESTLAKE EF378 LDPE, MARFLEX 5430 LDPE, MARFLEX 1017 LDPE, MARFLEX 4517 LDPE, and MARFLEX 4751 LDPE.

Figure 17:
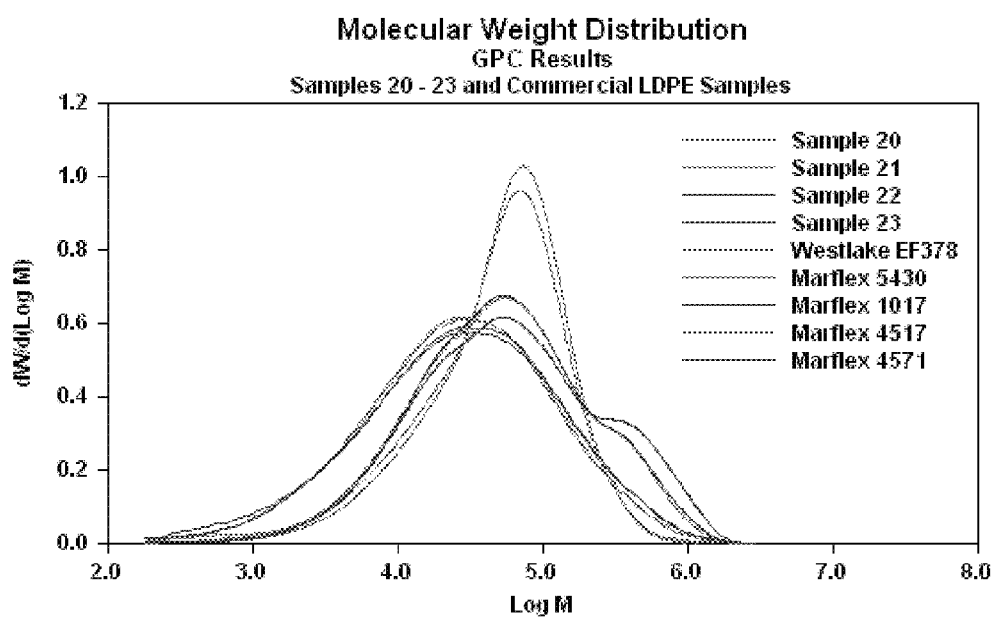
FIG. 17 is a comparison of the weight average molecular weight of samples from Example 5 and commercial LDPE samples.

The molecular weight distribution profiles of Samples 20-23 and the commercial LDPE resins are plotted in FIG. 17. While the $M_w$ is similar for the Samples 20-23, and the LDPE samples, the MWD profile of the LDPE resins is broader than that of the RCR$_{HMW}$ samples.

Figure 18:
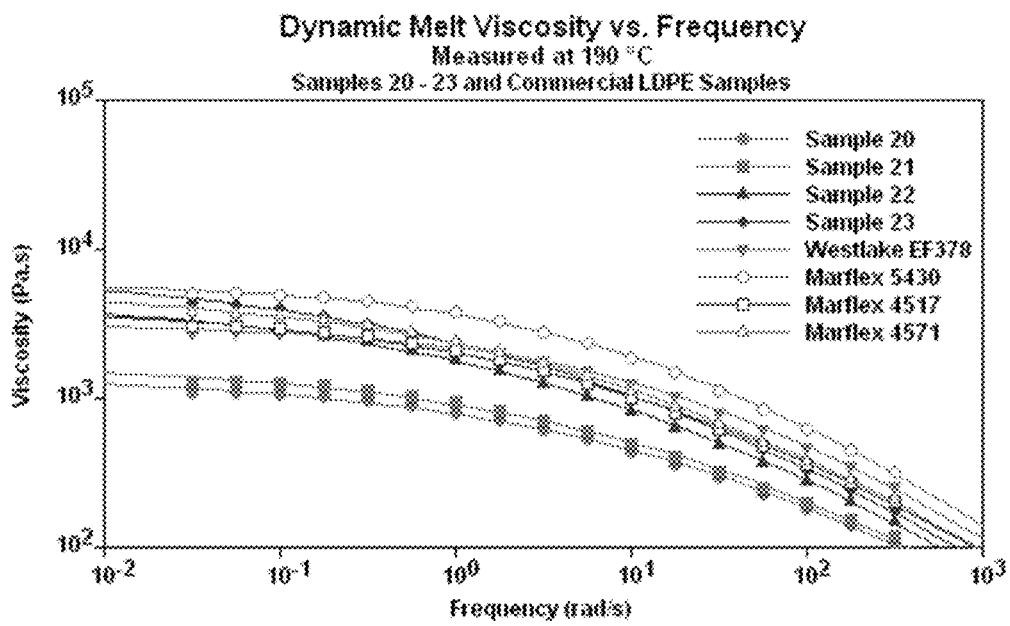
FIG. 18 is a comparison of dynamic melt rheology of samples from Example 5 and commercial LDPE samples.

FIG. 18 displays dynamic rheology curves for samples 20-23 and the five LDPEs. As shown in FIG. 18, all polymer samples rheological behavior can be fitted with the C-Y equation very well. The C-Y fitting curves are the solid lines for the resin samples from Table 8 and the dashed lines for the commercially available LDPEs, while the data points represent the experimentally collected data. Overall viscosity values are comparable between the RCR$_{HMW}$ samples and the LDPE resin suggesting the resins would display similar processability.

Figure 19:
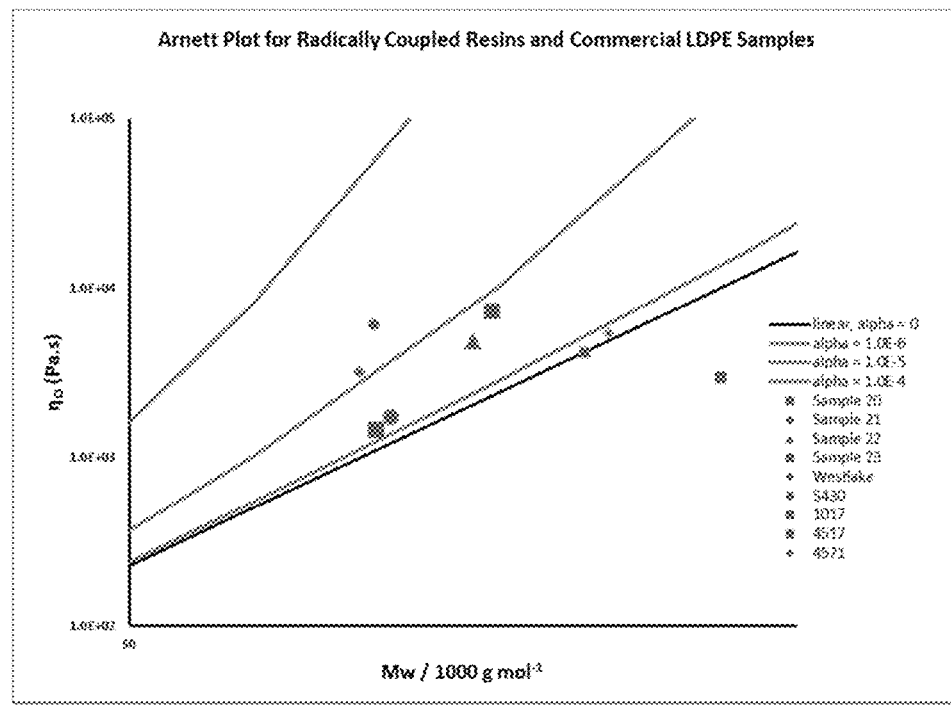
FIG. 19 is a plot of weight average molecular weight and zero-shear viscosity comparing samples from Example 5 with commercial LDPE samples.

FIG. 19 presents an Arnett plot of the melt zero-shear viscosity as a function of the $M_w$ for the RCR$_{homo}$ Samples 20-23 and the LDPE resins. Referring to FIG. 19, when α=0, i.e., it is expected that there are no long branch vertexes present, that the Arnett 3.4-power law applies; two of the commercial autoclave LDPE samples (i.e., MARFLEX 4517, MARFLEX 4571) fall on this line, despite their high levels of long chain branching. When α>0, i.e., there are long branch vertexes present, the Arnett 3.4-power law no longer applies, and there is a positive deviation from the Arnett 3.4-power law: the higher the number of long branch vertexes present, the higher the α value, the higher the deviation. This is the case for two of the commercial LDPE samples (i.e., WESTLAKE EF378, MARFLEX 5430) and for RCR$_{HMW}$ Samples 20-23. One of the commercial samples (i.e., MARFLEX 1017) displays the most pronounced negative deviation from the Arnett 3.4-power law. For Samples 20-23 as well as all the commercial LDPE examples, the amount of LCB, as measured by SEC-MALS and $^{13}$C NMR spectroscopy is underestimated by several orders of magnitude. This underestimation of long chain branching in the Arnett plot is a sign of hyperbranching, where the high amounts of LCB limit chain entanglement.

The effect of resin type (metallocene vs. Ziegler) on the behavior of the RCR$_{HMW}$ samples was investigated. Various properties of RCR$_{HMW}$ samples produced using metallocene-based polyethylene resins, designated samples 29-36, and RCR$_{HMW}$ samples produced using Ziegler-based polyethylene resins, designated samples 37-44, are presented in Table 10 and Table 11, respectively.

Data are also presented for the PARPOL, designated C5 in Table 10 and C6 in Table 11.

TABLE 10

| Sample | DHBP [wt. %] | $M_n$/1000 g/mol | $M_w$/1000 g/mol | $M_w/M_n$ | Density g/ml | MI g/10 min. | HLMI g/10 min. |
|---|---|---|---|---|---|---|---|
| C5 | — | 6.16 | 30.91 | 5.02 | 0.9741 | >200 | >200 |
| 29 | 1.4 | 6.71 | 60.62 | 9.03 | 0.9729 | 38.1 | >200 |
| 30 | 1.6 | 6.59 | 66.21 | 10.05 | 0.9730 | 27.6 | >200 |
| 31 | 1.9 | 6.33 | 68.64 | 10.84 | 0.9730 | 16.8 | >200 |
| 32 | 2.3 | 6.85 | 71.78 | 10.48 | 0.9734 | 8.4 | >200 |
| 33 | 2.5 | 6.62 | 70.57 | 10.66 | 0.9744 | 7.8 | >200 |
| 34 | 2.8 | 6.61 | 70.27 | 10.63 | 0.9745 | 3.8 | >200 |
| 35 | 3.1 | 6.53 | 72.94 | 11.17 | 0.9751 | 1.7 | 187.1 |
| 36 | 3.4 | 6.55 | 68.71 | 10.49 | 0.9763 | 1.1 | 143.1 |

TABLE 11

| Sample | DHBP [wt. %] | $M_n$/1000 g/mol. | $M_w$/1000 g/mol. | $M_w/M_n$ | Density g/ml | MI g/10 min. | HLMI g/10 min. |
|---|---|---|---|---|---|---|---|
| C6 | — | 8.16 | 49.27 | 6.04 | 0.9710 | >200 | >200 |
| 37 | 1.0 | 8.76 | 75.94 | 8.67 | 0.9670 | 4.2 | >200 |
| 38 | 1.2 | 8.52 | 71.25 | 8.36 | 0.9660 | 2.2 | >200 |
| 39 | 1.3 | 8.28 | 71.08 | 8.58 | 0.9658 | 1.4 | 172.4 |
| 40 | 1.5 | 8.3 | 65.28 | 7.87 | 0.9672 | 1.6 | 151.2 |
| 41 | 1.8 | 7.75 | 63.95 | 8.25 | 0.9670 | 0.9 | 87.5 |
| 42 | 2.1 | 9.21 | 80.12 | 8.70 | 0.9677 | 0.4 | 81.7 |
| 43 | 2.4 | 8.89 | 80.36 | 9.04 | 0.9681 | 0.1 | 44.4 |
| 44 | 2.8 | 8.52 | 77.02 | 9.04 | 0.9689 | 0.0 | 22.1 |

For $RCR_{HMW}$ samples 29-36 (i.e., metallocene resins) the $M_w$/1,000 of the polymer was found to increase with increasing concentrations of the coupling agent, DHBP, while the $M_n$/1,000 remained constant when compared to the same property for their PARPOL (i.e., Sample C5). The MI values for $RCR_{HMW}$ samples 29-36 (i.e., metallocene resin PARPOL) were found to decrease with an increase in the amount of coupling agent used. When the amount of coupling agent used was high (>3 wt. %), the HLMI also started to decrease with increasing the amount of DHBP. The properties of the $RCR_{HMW}$ samples 37-44 (i.e., Ziegler resin PARPOL) were similar to those observed for $RCR_{HMW}$ samples 29-36.

Coagent Effect

The effect of the coagent during the reactive extrusion process on the properties of the RCR samples was investigated. The PARPOL was the high MW PE that was also used for the data in Table 9. For reactive extrusion, the PARPOL (C4) was contacted with the coupling agent DHBP and the coagent triallyl cyanurate (TAC) in the amounts indicated in Table 12 to produce Samples 45-52.

TABLE 12

| Sample No. | DHBP [wt. %] | TAC [wt. %] | MI g/10 min. | HLMI g/10 min. |
|---|---|---|---|---|
| 45 | 1.40 | — | 18.1 | >200 |
| 56 | 1.40 | 0.15 | 9.0 | >200 |
| 57 | 1.40 | 0.30 | 2.7 | >200 |
| 58 | 1.40 | 0.45 | 0.7 | 87.3 |
| 49 | 1.04 | — | 44.7 | >200 |
| 50 | 1.04 | 0.15 | 14.5 | >200 |
| 51 | 1.04 | 0.30 | 7.0 | >200 |
| 52 | 1.04 | 0.45 | 2.6 | 153.3 |

For each of the coupling agent concentrations used, an increase in the amount of coagent led to a decrease in the MI for the $RCR_{HMW}$. When the coagent concentration reached a value of 0.45 wt. %, the HLMI for the $RCR_{HMW}$ samples started to decrease as well. The results in Table 11 indicate that the presence of a coagent can allow for a 26% reduction (from 1.40 wt. % to 1.04 wt. %) in the amount of coupling compound while preserving desirable characteristics of the RCR, such as elevated HLMI.

Example 6

A PE PARPOL of the type disclosed herein was obtained using the metallocene catalyst from Example 1. Properties of the resulting PE polymers of the present disclosure designated Samples 20-26, are summarized in Table 13. Samples SC-1 through DC-C-2 are comparative polymers prepared as described in U.S. Patent Publication No. 2005/0153830 to Jensen et al.

TABLE 13

| Sample No. | $M_n$/1000 g/mol. | $M_z$/1000 g/mol. | Crossover Modulus | Crossover Frequency |
|---|---|---|---|---|
| 20 | 7.92 | 311.31 | 1.41E+04 | 1.10E+01 |
| 21 | 7.81 | 299.3 | 1.41E+04 | 1.85E+01 |
| 22 | 7.94 | 357.16 | 1.50E+04 | 3.50E01 |
| 23 | 6.66 | 364.91 | 1.53E+04 | 4.13E+01 |
| 24 | 6.76 | 409.22 | 1.80E+04 | 1.33E+02 |
| 25 | 7.53 | 336.36 | 1.69E+04 | 1.37E+02 |
| 26 | 7.25 | 345.68 | 1.42E+04 | 1.01E+01 |
| SC-1 | 16.3 | | 4.98E+04 | 1.85E+02 |
| SC-2 | 24.6 | | 1.06E+05 | 7.15E+02 |
| SC-4 | 16 | 422 | 1.10E+05 | 1.19E+03 |
| SC-5 | 16 | 391 | 7.64E+04 | 7.84E+02 |
| DC-A-1 | 13.86 | 374.8 | 4.34E+04 | 2.88E+02 |
| DC-A-2 | 16.12 | 394.3 | 4.01E+04 | 4.97E+02 |
| DC-A-3 | 14.52 | 365.6 | 3.90E+04 | 7.34E+02 |
| DC-B-1 | 17.04 | 631 | 3.83E+04 | 4.60E+02 |
| DC-B-2 | 15.03 | 519.1 | 3.80E+04 | 7.93E+02 |
| DC-B-3 | 15 | 458.8 | 3.74E+04 | 1.08E+03 |

TABLE 13-continued

| Sample No. | $M_n$/1000 g/mol. | $M_z$/1000 g/mol. | Crossover Modulus | Crossover Frequency |
|---|---|---|---|---|
| DC-C-1 | 13.63 | 665.6 | 7.11E+07 | 2.87E+08 |
| DC-C-2 | 12.93 | 632.2 | 6.45E+08 | 1.1E+10 |

Figure 20A:
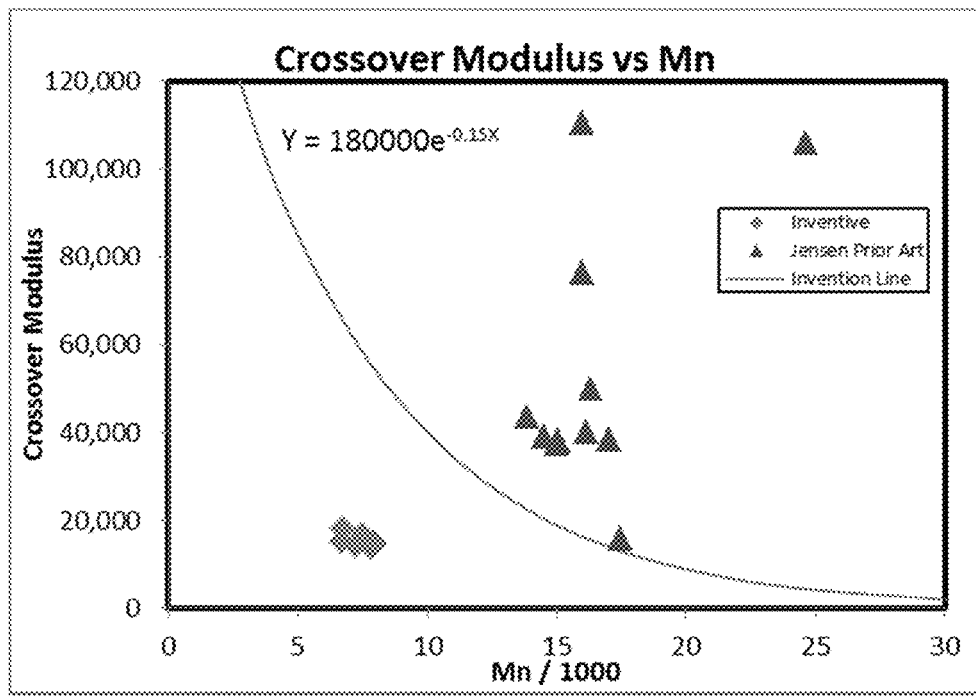
FIGS. 20A and 20B are plots of the crossover modulus as a function of $M_n/1,000$ and $M_z/1,000$, respectively.
Figure 20B:
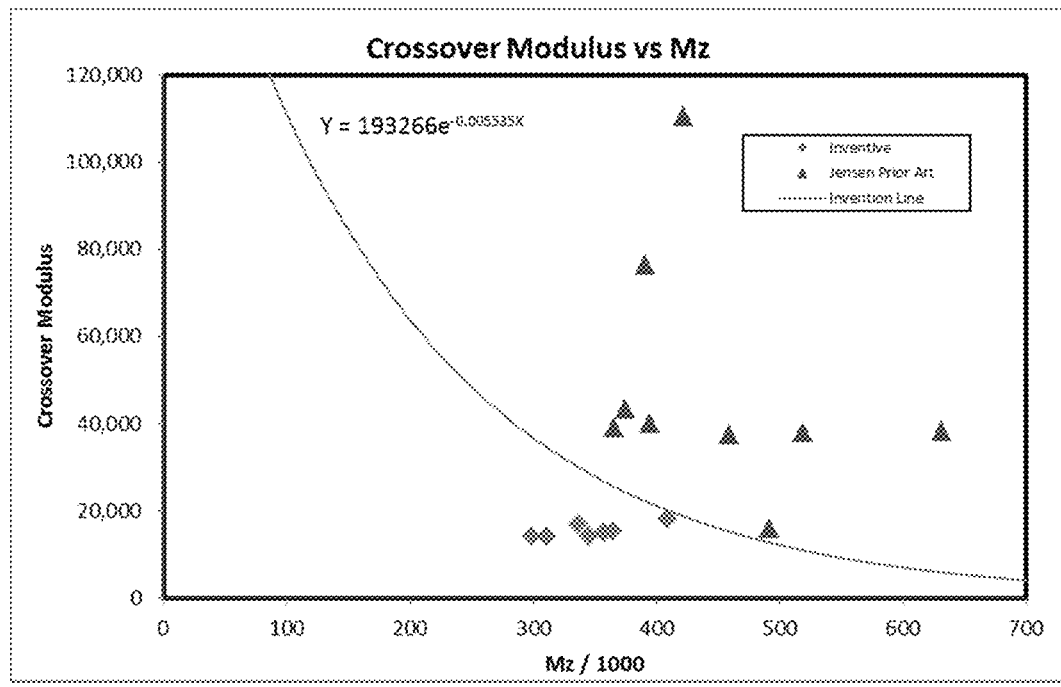
Figure 21A:
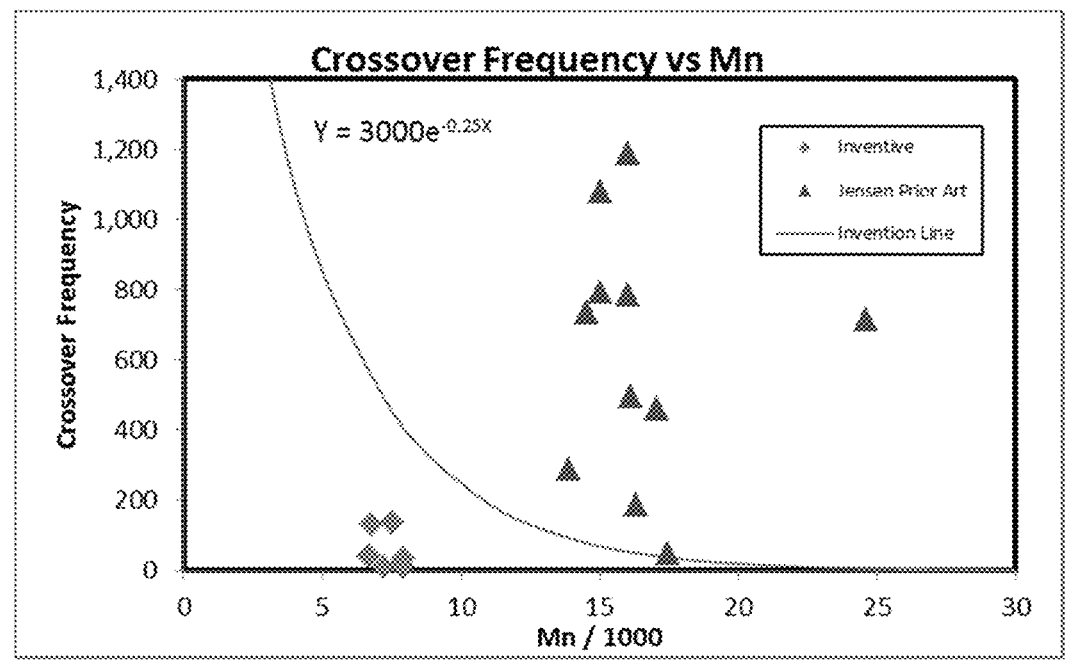
FIGS. 21A and 21B are plots of the crossover frequency as a function of $M_n/1,000$ and $M_z/1,000$, respectively.
Figure 21B:
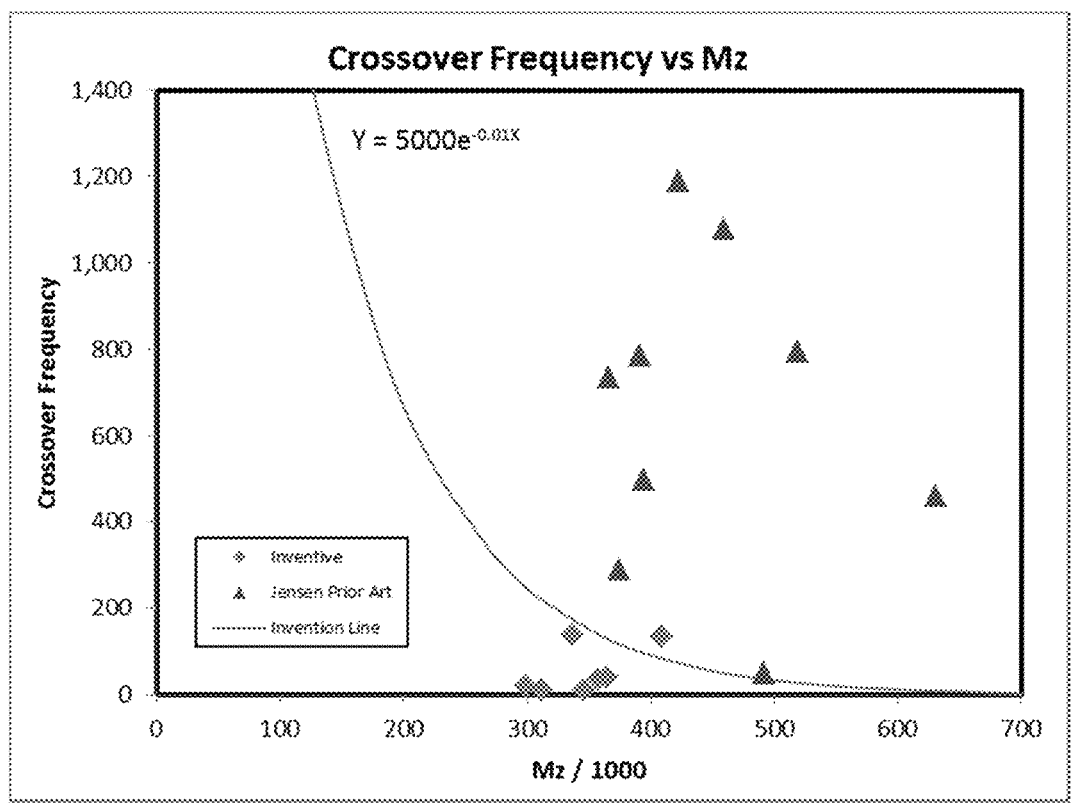

A plot of the crossover modulus as a function of $M_n/1,000$ and $M_z/1,000$ is shown in FIGS. 20A and 20B while a plot of crossover frequency as a function of $M_n/1,000$ and $M_z/1,000$ is shown in FIGS. 21A and 21B. The crossover modulus is the value of storage modulus (G') and loss modulus (G") at the crossover frequency ($\omega_c$) where G' and G" are equal, and the crossover modulus is presented in units of Pa. This is determined by graphing the storage modulus and loss modulus as a function of shear rate. The storage modulus in viscoelastic materials measures the stored energy and represents the elastic portion of the material. The loss modulus relates to the energy dissipated as heat and represents the viscous portion related to the amount of energy lost due to viscous flow. FIGS. 20A and 20B, and FIGS. 21A and 21B demonstrate that the crossover frequency and crossover modulus for the inventive materials occupy a different region on the plots than those of the comparative sample.

ADDITIONAL DISCLOSURE

The following enumerated embodiments are provided as non-limiting examples.

A first embodiment which is a radically coupled polymer having a density of from about 0.915 g/ml to about 0.975 g/ml characterized by a crossover modulus that is equal to or less than $y_{mn}$ where $y_{mn}=180,000e^{-0.15x}$ and x is the number average molecular weight of the radically coupled polymer divided by 1,000, the crossover modulus being measured in units of Pa.

A second embodiment which is the polymer of the first embodiment characterized by a crossover modulus that is equal to or less than $y_{mz}$ where $y_{mz}=193266e^{-0.005535x}$ and x is the z-average molecular weight of the radically coupled polymer radically coupled polymer divided by 1,000, and the crossover modulus being measured in units of Pa.

A third embodiment which is the polymer of any of the first through second embodiments characterized by a crossover frequency that is equal to or less than the value $f_{mn}$ where $f_{mn}=3000e^{-0.25x}$ and x is the number average molecular weight of the radically coupled polymer divided by 1,000.

A fourth embodiment which is the polymer of any of the first through third embodiments characterized by a crossover frequency that is equal to or less than the value $f_{mz}$ where $f_{mz}=5,000e^{-0.01x}$ and x is the z-average molecular weight of the radically coupled polymer divided by 1,000.

A fifth embodiment which is the polymer of any of the first through fourth embodiments having a weight-average molecular weight ranging from about 25 Kg/mol to about 250 Kg/mol.

A sixth embodiment which is the polymer of any of the first through fifth embodiments having a polydispersity index of from about 4 to about 40.

A seventh embodiment which is the polymer of any of the first through sixth embodiments having at least two types of short chain branching.

An eighth embodiment which is the polymer of the seventh embodiment wherein the types of short chain branching are selected from the group consisting of ethyl, butyl, hexyl, 4-methylpentyl and octyl.

A ninth embodiment which is the polymer of any of the first through eighth embodiments having a flow activation energy of from about 35 kJ mol$^{-1}$ to about 70 kJ mol$^{-1}$.

A tenth embodiment which is an ethylene polymer having a level of short chain branching ranging from about 0 to about 10 mol. %; a level of long chain branching ranging from about 0.001 LCB/10$^3$ carbons to about 1.5 LCB/10$^3$ carbons as determined by SEC-MALS; and characterized by a crossover modulus that is equal to or less than $y_{mn}$ where $y_{mn}=180,000e^{-0.15x}$ and x is the number average molecular weight of the radically coupled polymer divided by 1,000, and the crossover modulus is measured in units of Pa.

An eleventh embodiment which is an ethylene polymer characterized by a higher molecular weight (HMW) component and a lower molecular weight (LMW) component having a polydispersity index ranging from about 8 to about 25; a level of long chain branching ranging from about 0.001 LCB/10$^3$ carbons to about 1.5 LCB/10$^3$ carbons as determined by SEC-MALS and characterized by a crossover modulus that is equal to or less than $y_{mn}$ where $y_{mn}=180,000e^{-0.15x}$ and x is the number average molecular weight of the radically coupled polymer divided by 1,000, and the crossover modulus is measured in units of Pa.

A twelfth embodiment which is the polymer of the eleventh embodiment having a weight-average molecular weight ranging from about 350 g/mol to about 50,000 g/mol.

A thirteenth embodiment which is the polymer of any of the eleventh through twelfth embodiments wherein the LMW component has a weight average molecular weight ranging from about 350 g/mol to about 40,000 g/mol.

A fourteenth embodiment which is the polymer of any of the eleventh through thirteenth embodiments having a polydispersity index of from about 1 to about 50.

A fifteenth embodiment which is the polymer of any of the eleventh through fourteenth embodiments characterized by a crossover modulus that is equal to or less than $y_{mz}$ where $y_{mz}=193266e^{-0.005535x}$ and x is the z-average molecular weight of the radically coupled polymer divided by 1,000, and the crossover modulus is measured in units of Pa.

A sixteenth embodiment which is the polymer of any of the eleventh through fifteenth embodiments characterized by a crossover frequency that is equal to or less than the value $f_{mn}$ where $f_{mn}=3000e^{-0.25x}$ and x is the number average molecular weight of the radically coupled polymer divided by 1,000.

A seventeenth embodiment which is the polymer of any of the eleventh through sixteenth embodiments characterized by a crossover frequency that is equal to or less than the value $f_{mz}$ where $f_{mz}=5,000e^{-0.01x}$ and x is the z-average molecular weight of the radically coupled polymer divided by 1,000.

An eighteenth embodiment which is the polymer of any of the eleventh through seventeenth embodiments having a high load melt index in the range of from about 100 dg/min. to about 5000 dg/min as determined in accordance with ASTM D1238.

A nineteenth embodiment which is the polymer of any of the eleventh through eighteenth embodiments characterized by a shear response in the range of from about 10 to about 500.

A twentieth embodiment which is the polymer of any of the eleventh through nineteenth embodiments characterized by a zero shear viscosity in the range of from about 1.0E+00 Pa-s to about 1.0E+06 Pa-s.

While various embodiments have been shown and described, modifications thereof can be made without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference in the disclosure is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A radically coupled ethylene polymer having a density of from about 0.915 g/ml to about 0.975 g/ml and subjected to a temperature of 190° C., the radically coupled polymer characterized by a crossover modulus that is measured in Pascals (Pa) and is equal to or less than $y_{mn}$ where $y_{mn}=180,000e^{-0.15x}$ and x is the number average molecular weight of the radically coupled polymer divided by 1,000.

2. The polymer of claim 1 characterized by a crossover modulus measured in Pa that is equal to or less than where $y_{mz}$ where $y_{mz}=193266e^{-0.005535x}$ and x is the z-average molecular weight of the radically coupled polymer divided by 1,000.

3. The polymer of claim 1 characterized by a crossover frequency that is equal to or less than the value $f_{mn}$ where $f_{mn}=3000e^{-0.25x}$ and x is the number average molecular weight of the radically coupled polymer divided by 1,000.

4. The polymer of claim 1 characterized by a crossover frequency that is equal to or less than the value $f_{mz}$ where $f_{mz}=5,000e^{-0.01x}$ and x is the z-average molecular weight of the radically coupled polymer divided by 1,000.

5. The polymer of claim 1 having a weight-average molecular weight ranging from about 25 Kg/mol to about 250 Kg/mol.

6. The polymer of claim 1 having a polydispersity index of from about 4 to about 40.

7. The polymer of claim 1 having at least two types of short chain branching.

8. The polymer of claim 7 wherein the types of short chain branching are selected from the group consisting of ethyl, butyl, hexyl, 4-methylpentyl and octyl.

9. The polymer of claim 1 having a flow activation energy of from about 35 kJ mol$^{-1}$ to about 70 kJ mol$^{-1}$.

10. An ethylene polymer having a level of short chain branching ranging from about 0 to about 10 mol. %; a level of long chain branching ranging from about 0,001 LCB/10$^3$ carbons to about 1.5 LCB/10$^3$ carbons as determined by SEC-MALS and subjected to a temperature of 190° C., characterized by a crossover modulus measured in Pascals (Pa) that is equal to or less than $y_{mn}$ where $y_{mn}=180,000e^{-0.15x}$ and x is the number average molecular weight of the radically coupled polymer divided by 1,000.

11. An ethylene polymer characterized by a higher molecular weight (HMW) component and a lower molecular weight (LMW) component having a polydispersity index ranging from about 8 to about 25; a level of long chain branching ranging from about 0.001 LCB/10$^3$ carbons to about 1.5 LCB/10$^3$ carbons as determined by SEC-MALS and subjected to a temperature of 190° C., characterized by a crossover modulus measured in Pa that is equal to or less than $y_{mn}$ where $y_{mn}=180,000e^{-0.15x}$ and x is the number average molecular weight of the radically coupled polymer divided by 1,000.

12. The polymer of claim 11 having a weight-average molecular weight ranging from about 350 g/mol to about 50,000 g/mol.

13. The polymer of claim 11 wherein the LMW component has a weight average molecular weight ranging from about 350 g/mol to about 40,000 g/mol.

14. The polymer of claim 11 having a polydispersity index of from about 1 to about 50.

15. The polymer of claim 11 Characterized by a crossover modulus measured in Pa that is equal to or less than $y_{mz}$ where $y_{mz}=193266e^{-0.005535x}$ and x is the z-average molecular weight of the radically coupled polymer divided by 1,000.

16. The polymer of claim 11 characterized by a crossover frequency that is equal to or less than the value $f_{mn}$ where $f_{mn}=3000e^{-0.25x}$ and x is the number average molecular weight of the radically coupled polymer divided by 1,000.

17. The polymer of claim 11 characterized by a crossover frequency that is equal to or less than the value where $f_{mz}$ where $f_{mz}=5,000e^{-0.01x}$ and x is the z-average molecular weight of the radically coupled polymer divided by 1,000.

18. The polymer of claim 11 having a high load melt index in the range of from about 100 dg/min. to about 5000 dg/min as determined in accordance with ASTM D1238.

19. The polymer of claim 11 characterized by a shear response in the range of from about 10 to about 500.

20. The polymer of claim 11 characterized by a zero shear viscosity in the range of from about 1.0E+00 Pa-s to about 1.0E+06 Pa-s.

* * * * *